United States Patent
Tsukamoto

(10) Patent No.: US 12,543,759 B2
(45) Date of Patent: Feb. 10, 2026

(54) RAW MEAT-LIKE MEAT ALTERNATIVE AND METHOD FOR PRODUCING RAW MEAT-LIKE MEAT ALTERNATIVE

(71) Applicant: FUJIFILM CORPORATION, Tokyo (JP)

(72) Inventor: Naoki Tsukamoto, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 250 days.

(21) Appl. No.: 18/536,283

(22) Filed: Dec. 12, 2023

(65) Prior Publication Data

US 2024/0114922 A1    Apr. 11, 2024

Related U.S. Application Data

(63) Continuation of application No. PCT/JP2022/040536, filed on Oct. 28, 2022.

(30) Foreign Application Priority Data

Oct. 29, 2021  (JP) .................... 2021-178080
Oct. 26, 2022  (JP) .................... 2022-171797

(51) Int. Cl.
 A23J 3/22     (2006.01)
 A23J 3/16     (2006.01)
 A23J 3/18     (2006.01)

(52) U.S. Cl.
 CPC ............... *A23J 3/227* (2013.01); *A23J 3/16* (2013.01); *A23J 3/18* (2013.01)

(58) Field of Classification Search
 None
 See application file for complete search history.

(56) References Cited

U.S. PATENT DOCUMENTS

| | | |
|---|---|---|
| 4,098,913 A | 7/1978 | Baugher |
| 4,755,393 A | 7/1988 | Toba et al. |
| 2020/0323238 A1 | 10/2020 | Pibarot et al. |

FOREIGN PATENT DOCUMENTS

| | | |
|---|---|---|
| JP | S52-057357 A | 5/1977 |
| JP | S63-071152 A | 3/1988 |
| JP | H02-041315 B2 | 9/1990 |
| JP | H10-056976 A | 3/1998 |

OTHER PUBLICATIONS

Meisenzahl, Mary, "'Printing' Steak Meat . . . Replicating the Real Taste and Texture with 3D Printing", Life Insider [online], Internet:<URL:https://www.businessinsider.jp/post-219661>, Sep. 10, 2020, [retrieval date: Dec. 22, 2022], in particular, pp. 1-7, non-official translation.
Chemical book—Coconut oil [online], Internet:<URL:https://web.archive.org/web/20210920021214/https://shop.nisshin.oilliogroup.com/shop/pages/column_201228.aspx>, Jan. 10, 2014, [retrieval date: Dec. 22, 2022], in particular, melting point.
Oil Style [online], Internet: <URL: https://web.archive.org/web/20210920021214/https://shop.nisshin.oilliogroup.com/shop/pages/column_201228.aspx>, Sep. 20, 2021, [retrieval date: Dec. 22, 2022], in particular, photo about properties, (Nisshin Oillio), non-official translation.
International Search Report issued in International Application No. PCT/JP2022/040536 on Jan. 10, 2023.
Written Opinion of the ISA issued in International Application No. PCT/JP2022/040536 on Jan. 10, 2023.
Written Opinion of the IPEA issued in International Application No. PCT/JP2022/040536 on Nov. 21, 2023.
International Preliminary Report on Patentability issued in International Application No. PCT/JP2022/040536 on Feb. 20, 2024.
English language translation of the following: Notice dated Jan. 7, 2025 from the JPO in a Japanese patent application No. 2023-556691 corresponding to the instant patent application.
Southey, Flora, "'World's first' plant-based steak marbled with sunflower oil: 'It's not just for aesthetics. It behaves as marbling does in animal meat'", Mar. 15, 2021, pp. 1-19, XP093237582, Retrieved from the Internet: URL:https://www.foodnavigator.com/Article/2021/03/15/World-s-first-plantbased-steak-marbled-with-sunflower-oil-It-s-not-just-for-aesthetics.-Itbehaves-as-marbling-does-in-animal-meat/ [retrieved on Jan. 9, 2025].
Cohen, Amir et al./Reuters, "Redefine Meat 3D-Printed Plant-Based Faux Steaks in photos—Business Insider", Sep. 3, 2020, p. 1-9, XP093237638, Retrieved from the Internet: URL:https://www.businessinsider.com/redefine-meat-3d-printed-plant-based-faux-steaks-in-photos-2020-9 [retrieved on Jan. 9, 2025].
Extended European Search Report dated Feb. 19, 2025, issued in corresponding EP Patent Application No. 22887204.0.

*Primary Examiner* — Jyoti Chawla
(74) *Attorney, Agent, or Firm* — SOLARIS Intellectual Property Group, PLLC

(57) ABSTRACT

A raw meat-like meat alternative, including a lean meat-like portion and a fat-like portion, wherein: an area of the fat-like portion on a surface is 3% or more with respect to an entire surface area; and the fat-like portion on the surface includes a portion having a minor axis of 1 mm or more and having a major axis of the fat-like portion on the surface of 3.0 or more times the minor axis; and a method for producing the raw meat-like meat alternative.

11 Claims, 21 Drawing Sheets

RAW MEAT-LIKE MEAT ALTERNATIVE AND METHOD FOR PRODUCING RAW MEAT-LIKE MEAT ALTERNATIVE

CROSS-REFERENCE TO RELATED APPLICATIONS

This application is a continuation application of International Application No. PCT/JP2022/040536, filed Oct. 28, 2022, which claims priority from Japanese Patent Application No. 2021-178080, filed Oct. 29, 2021, and Japanese Patent Application No. 2022-171797, filed Oct. 26, 2022. The entire disclosure of each of the above applications is incorporated herein by reference.

TECHNICAL FIELD

The present disclosure relates to a raw meat-like meat alternative and a method for producing a raw meat-like meat alternative.

BACKGROUND ART

Livestock meat is a foodstuff widely consumed in the world. However, from the viewpoint of maintaining health, attempts have been made to refrain from taking livestock meat and to take meat-like food (hereinafter may be referred to as "meat alternative") that uses vegetable proteins derived from plants such as soybeans as a raw material.

In recent years, attempts have been made to bring the food texture of the meat alternative closer to that of the livestock meat. For example, Japanese Patent Publication (JP-B) No. H02-41315 proposes "a method for producing a meat-like foodstuff including mixing: an o/w type emulsion having a compression oil-releasing ratio of at least 15% and composed mainly of (a) a protein, (b) a fat and/or oil, and (c) water, the weight ratio of (a):(b):(c) being 1:7-40:1-20; a fibrous protein prepared by kneading a mixture of a vegetable protein-containing material and water, allowing the resulting mixture to be oriented by applying a shear stress while heating, and thereafter, defibrating the resulting material; and a binder, such that the amount of the o/w type emulsion is from 5 to 50% by weight of the meat-like foodstuff, and molding and heating the resulting mixture".

SUMMARY OF INVENTION

Technical Problem

Meat alternatives currently on the market are those that do not resemble livestock meat by appearance before cooking, or those that resemble ground livestock meat (livestock meat grounded by a mincer or the like and finely shredded). However, there is a high demand for livestock meat in the form of a chunk of raw meat (hereinafter may be referred to as "a chunk of meat"). Therefore, from the viewpoint of the increased demand for the meat alternative, a meat alternative having an appearance similar to a chunk of meat is being desired.

An object of an embodiment according to the present disclosure is to provide a meat alternative having an appearance similar to a chunk of meat and a method for producing the same.

Solution to Problem

The above problem is solved by the following means.

(1) A raw meat-like meat alternative, including a lean meat-like portion and a fat-like portion, wherein:
  an area of the fat-like portion on a surface is 3% or more with respect to an entire surface area; and
  the fat-like portion on the surface includes a portion having a minor axis of 1 mm or more and having a major axis of the fat-like portion on the surface of 3.0 or more times the minor axis.

(2) The raw meat-like meat alternative according to (1), wherein the lean meat-like portion contains a vegetable protein and is sponge-like or fibrous.

(3) The raw meat-like meat alternative according to (1) or (2), wherein the fat-like portion has a depth of 100 µm or more from the surface.

(4) The raw meat-like meat alternative according to any one of (1) to (3), wherein the fat-like portion contains an oil and/or fat having a melting point of 10° C. or higher.

(5) The raw meat-like meat alternative according to any one of (1) to (4), wherein the fat-like portion contains an emulsion.

(6) The raw meat-like meat alternative according to any one of (1) to (5), wherein the fat-like portion contains an oil and/or fat encapsulated in a gel.

(7) The raw meat-like meat alternative according to (6), wherein transparency of the fat-like portion is increased by heating.

(8) The raw meat-like meat alternative according to any one of (1) to (7), wherein the lean meat-like portion contains an oil and/or fat.

(9) The raw meat-like meat alternative according to (8), wherein the oil and/or fat contained in the lean meat-like portion is a vegetable oil.

(10) The raw meat-like meat alternative according to any one of (1) to (9), wherein an oil and/or fat encapsulated in a gel is contained inside the raw meat-like meat alternative.

(11) A method for producing a raw meat-like meat alternative, the method including:
  forming a lean meat-like portion having a red color and forming a groove having a depth of 100 µm or more from a surface of the lean meat-like portion, or forming a lean meat-like portion having a red color while forming a groove having a depth of 100 µm or more from a surface of the lean meat-like portion; and
  thereafter depositing an oil and/or fat in the groove to form a fat-like portion.

(12) The method for producing a raw meat-like meat alternative according to (11), wherein at least the groove is formed with a mold.

According to an embodiment of the disclosure, a meat alternative having an appearance similar to a chunk of meat and a method for producing the same are provided.

DESCRIPTION OF EMBODIMENTS

Figure 1:
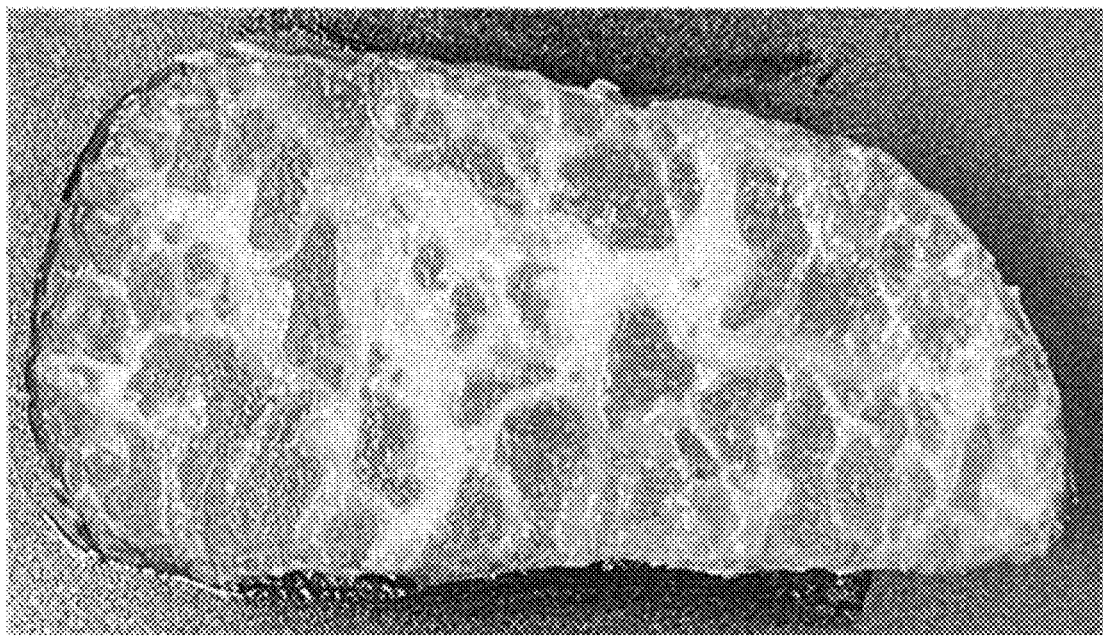
FIG. 1 is a trial production example of a raw meat-like meat alternative according to the present embodiment.

Hereinafter, exemplary embodiments of the present disclosure will be described. The descriptions and examples are provided to illustrate the embodiments and do not limit the scope of the invention.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

Each component may contain plural substances corresponding to the component.

In a case in which the amount of a component is mentioned, when plural substances corresponding to the component are present in a composition, the amount of the component refers to the total amount of the plural substances present in the composition, unless otherwise specified.

The term "step" encompasses not only an independent step but also a step that is not clearly separated from another step, as long as the intended function of the step is achieved.

In the present specification, a combination of two or more preferred embodiments is a more preferred embodiment.

<Raw Meat-Like Meat Alternative>

A raw meat-like meat alternative according to an embodiment of the present disclosure includes a lean meat-like portion and a fat-like portion, wherein: an area of the fat-like portion on a surface of the raw meat-like meat alternative is 3% or more with respect to an entire area of the surface; and the fat-like portion on the surface includes a portion having a minor axis of 1 mm or more and having a major axis of 3.0 or more times the minor axis.

The raw meat-like meat alternative according to an embodiment of the present disclosure has an appearance similar to a chunk of meat by adopting the foregoing configuration. The reason for this is presumed as follows.

Here, in the present specification, the term "chunk of meat" refers to uncooked raw livestock meat that has been cut out from livestock for meat into a certain size and that has not been ground or shredded after being cut out from livestock.

A chunk of meat has lean meat, which has a color close to red, and fat, which has a color close to white, on its surface. Fat on the surface of a chunk of meat occupies a certain area (for example, in a chunk of meat of a portion having only a small amount of fat, such as beef fillet meat, the area of fat on the surface of the chunk of meat is about 3%). In many cases, fat has a long and thin shape on the surface of a chunk of meat.

The raw meat-like meat alternative according to an embodiment of the present disclosure has a lean meat-like portion having an appearance similar to lean meat of a chunk of meat and a fat-like portion having an appearance similar to fat of a chunk of meat. A raw meat-like meat alternative according to an embodiment of the present disclosure has an area of the fat-like portion on a surface of the raw-meat-like meat alternative of 3% or more with respect to the entire area of the surface, and includes a portion of the fat-like portion on the surface having a minor axis of 1 mm or more and having a major axis of 3.0 or more times the minor axis. Therefore, the fat-like portion has a long and thin shape, and the area of the fat-like portion on the surface of the raw meat-like meat alternative accounts for an area equal to or larger than the area of fat on the surface of a chunk of meat. Therefore, the raw meat-like meat alternative according to an embodiment of the present disclosure has an appearance similar to a chunk of meat.

(Lean Meat-Like Portion)

The lean meat-like portion refers to a portion corresponding to a portion that resembles lean meat in the raw meat-like meat alternative.

The lean meat-like portion has an appearance similar to lean meat of a chunk of meat.

The lean meat-like portion contains a protein, and preferably contains an oil and/or fat, a binder, and other additives, as necessary.

—Protein—

The lean meat-like portion contains a protein.

The protein mainly includes a vegetable protein, and may include an animal protein in addition to the vegetable protein.

The expression "mainly includes a vegetable protein" means that the amount of the vegetable protein included in the protein accounts for 50% by mass or more of the entire protein.

The vegetable protein is a protein obtained from a plant.

The vegetable protein is not particularly limited as long as it is a protein obtained from a plant. Examples of the origin of the vegetable protein include: grains, such as wheat, barley, oats, rice, or corn; beans, such as soybeans, peas, red beans, chick beans, lentils, broad beans, green beans, or lupin beans; seeds and nuts, such as almonds, peanuts, cashew nuts, pistachios, hazelnuts, macadamia nuts, linseeds, sesame, rapeseeds, cotton seeds, safflower seeds, or sunflower seeds; potatoes, such as potato, sweet potato, yam, kiku potato, or cassava; vegetables, such as asparagus, artichoke, cauliflower, broccoli, or green beans; fruit, such as banana, jack fruit, kiwi fruit, coconut, avocado, or olive; mushrooms, such as common mushroom, eringi mushroom, shiitake mushroom, shimeji mushroom, or maitake mushroom; and alga, for example, *chlorella, spirulina, euglena*, laver, combu, wakame, hijiki, tengusa, or mozuku. Among them, from the viewpoint of obtaining a raw meat-like meat alternative having an appearance and food texture similar to those of a chunk of meat, the origin of food protein is preferably at least one selected from the group consisting of wheat, soybeans, peas, and rice, and more preferably at least one selected from the group consisting of soybeans and wheat.

The vegetable protein may contain one kind of plant-derived protein or two or more kinds of plant-derived proteins.

The animal protein is a protein that can be obtained from an animal.

The animal protein may be collected from an animal, or may be obtained by producing and extracting a protein having the same amino acid sequence as that of a protein obtained from an animal, by cell culture or enzymatic reactions.

The animal protein is not particularly limited as long as it is a protein that can be obtained from an animal. Examples of the animal protein include collagen, gelatin, keratin, fibroin, sericin, casein, conchiolin, elastin, protamine, egg yolk protein, and albumen protein.

One kind of animal protein may be contained or two or more kinds of animal proteins may be contained.

From the viewpoint of obtaining a raw meat-like meat alternative having a food texture closer to a chunk of meat, the protein preferably has a muscle-like tissue.

Here, the muscle-like tissue refers to a tissue that has a structure similar to a fiber bundle and that can be torn into a fibrous shape in a certain direction.

Lean meat of livestock meat is derived from muscles. Muscles are composed of bundles of muscle fibers. Therefore, lean meat of livestock meat has a structure that resembles bundles of fibers. When the protein contained in the lean meat-like portion of the raw meat-like meat alternative according to the present embodiment has a muscle-like tissue, food texture that can be felt by the presence of muscle fibers upon eating livestock meat can be presented.

Examples of the method for making the protein have a muscle-like tissue include a method of adding a protein, adding water or the like, and performing extrusion molding using an extruder.

By extrusion-molding a protein while applying a shear stress, the protein has a structure similar to a fiber bundle and has a tissue that can be torn into fibers.

The content of the protein is preferably from 5% by mass to 80% by mass, more preferably from 7% by mass to 70% by mass, and still more preferably 10% by mass to 60% by mass, with respect to the entire lean meat-like portion.

The raw meat-like meat alternative according to the present disclosure preferably contains a fibrous bundle-like organized protein.

Here, the fibrous bundle-like organized protein is a protein having a certain fiber bundle-like tissue.

The fibrous bundle-like shape refers to a structure similar to a bundle of fibers that extend in one direction.

The fibrous bundle-like organized protein is preferably a fibrous bundle-like organized protein having a muscle-like tissue, from the viewpoint of the shape and the food texture.

Here, the muscle-like tissue refers to a tissue that has a structure similar to a bundle of fibers and that can be torn in a certain direction.

In particular, the muscle-like tissue is preferably a tissue that has a structure similar to a bundle of fibers and that can be torn into a fibrous shape in a certain direction.

Lean meat of livestock meat is derived from muscles. Muscles are composed of bundles of muscle fibers. Therefore, the lean meat of livestock meat has a structure that resembles a bundle of fibers. By applying a fibrous bundle-like organized protein having a muscle-like tissue to the raw meat-like meat alternative according to the present disclosure, a meat alternative having a food texture closer to that of livestock meat can be obtained.

The fibrous bundle-like organized protein is preferably composed of a vegetable protein.

The definition of the vegetable protein is the same as the one described above, and the preferred embodiments thereof are also the same.

The vegetable protein may contain one kind of plant-derived protein or two or more kinds of plant-derived proteins.

In the fibrous bundle-like organized protein contained in the raw meat-like meat alternative according to the present disclosure, the fiber axis direction of the fibrous bundle-like organized protein is oriented in one direction in the proximity.

Here, the fiber axis direction of the fibrous bundle-like organized protein means the direction in the longitudinal direction of the fiber forming the muscle-like tissue.

In addition, regarding the expression that "the fiber axis direction of the fibrous bundle-like organized protein is oriented in one direction in the proximity", the fiber axis direction of the organized protein may be oriented in a certain direction as a whole while some organized proteins having different fiber axis directions may be contained, or the fiber axis direction of the organized protein may be oriented in one direction in the proximity while the direction of the fiber axis varies region by region.

A sponge-like organized protein having an isotropic porous structure is also formed into a fibrous bundle-like organized protein by a method of loosening the protein into a fibrous shape or a method of cutting the protein into a fibrous shape.

From the viewpoint of the appearance and the food texture, the fibrous bundle-like organized protein contained in the raw meat-like meat alternative is more preferably a fiber-shaped fibrous bundle-like organized protein.

The content of the fibrous bundle-like organized protein is preferably from 5% by mass to 95% by mass, more preferably from 7% by mass to 90% by mass, and still more preferably from 10% by mass to 85% by mass, with respect to the entire raw meat-like meat alternative.

—Oil and/or Fat—

The lean meat-like portion preferably contains an oil and/or fat.

While lean meat contained in livestock meat has a lower content of oil and/or fat than the fat-like portion, the lean meat may contain a certain amount of an oil and/or fat. A raw meat-like meat alternative tends to have a similar composition to that of lean meat of a chunk of meat when the lean meat-like portion contains an oil and/or fat. Therefore, a raw meat-like meat alternative having a food texture closer to that of livestock meat tends to be able to be obtained.

The oil and/or fat contained in the lean meat-like portion is preferably a vegetable oil.

When the lean meat-like portion contains a vegetable oil, the raw material of the lean meat-like portion is derived from a plant. Therefore, even if there is a necessity for avoiding or limiting the intake of animal food for reasons such as health, animal welfare, religion, allergy, and food crisis owing to population increase, a meat alternative tends to be able to be provided.

The content of the oil and/or fat contained in the lean meat-like portion is preferably from 0% by mass to 50% by mass, more preferably from 1% by mass to 40% by mass, and still more preferably from 3% by mass to 30% by mass, with respect to the entire lean meat-like portion.

It is preferable that, unlike the fat-like portion, the oil and/or fat contained in the lean meat-like portion is contained in the entire lean meat-like portion with high uniformity, and does not have an appearance similar to the fat of a chunk of meat.

—Binder and Enzyme—

The lean meat-like portion preferably contains at least one selected from the group consisting of a binder and an enzyme that hardens a protein, as necessary.

When the lean meat-like portion contains at least one selected from the group consisting of a binder and an enzyme that hardens a protein, the lean meat-like portion easily maintains a single integrated shape.

The binder is not particularly limited as long as it is edible and can maintain the shape of the lean meat-like portion.

Examples of the binder include a protein, a thickening polysaccharide, and a starch. One kind of the binder may be contained singly, or two or more kinds thereof may be contained.

The protein used as the binder may be the same as or different from the protein contained in the lean meat-like portion.

Examples of the protein used as the binder include a vegetable protein and an animal protein.

Examples of the vegetable protein used as a binder include a protein derived from wheat, soybeans, rice, or the like.

Examples of the animal protein used as a binder include milk protein and egg albumen.

Here, it is preferable to use transglutaminase as the enzyme that hardens the protein.

As the transglutaminase, commercially available products can be used, and examples thereof include ACTIVA (registered trademark) series manufactured by Ajinomoto Co., Inc.

Examples of the thickening polysaccharide include agar, carrageenan (κ-carrageenan, ι-carrageenan), alginic acid, alginate, agarose, furcellaran, gellan gum, gluconodeltalactone, *azotobacter vinelandii* gum, xanthan gum, pectin, guar gum, locust bean gum, tara gum, *cassia* gum, glucomannan, tragacanth gum, karaya gum, pullulan, gum arabic, arabinogalactan, dextran, carboxymethyl cellulose sodium salt, methyl cellulose, *psyllium* seed gum, starch, chitin, chitosan, curdlan, tamarind seed gum, soybean polysaccharide, gelatin, *psyllium*, hydroxypropyl methyl cellulose, hydroxyethyl cellulose, carboxymethyl cellulose, and dextrin.

The thickening polysaccharide may be used as a gelation agent or may be a gelled one.

The gelation agent is preferably used together with a gelation accelerator.

The gelation accelerator is a compound that accelerates gelation upon contacting with the gelation agent, and exhibits its function by a specific combination with the gelation agent.

Preferred combinations of the gelation agent and the gelation accelerator are as follows.

1) A combination of a polyvalent metal ion (specifically, an alkali metal ion, such as potassium ion, or an alkaline earth metal ion, such as calcium ion or magnesium ion) as a gelation accelerator, and carrageenan, alginate, gellan gum, *azotobacter vinelandii* gum, pectin, carboxymethylcellulose sodium salt, or the like, as a gelation agent.
2) A combination of boric acid or another boron compound as a gelation accelerator, and guar gum, locust bean gum, tara gum, cacia gum, or the like, as a gelation agent.
3) A combination of an acid or an alkali as a gelation accelerator, and alginate, glucomannan, pectin, chitin, chitosan, curdlan, or the like, as a gelation agent.
4) A water-soluble polysaccharide that reacts with the gelation agent to form a gel is used as the gelation accelerator. Specifically, examples thereof include a combination in which xanthan gum is used as a gelation agent and cacia gum is used as a gelation accelerator, and a combination in which carrageenan is used as a gelation agent and locust bean gum is used as a gelation accelerator.

From the viewpoint of obtaining a raw meat-like meat alternative having an appearance and food texture similar to a chunk of meat, a combination of the gelation agent and the gelation accelerator is preferably "1) the combination of a polyvalent metal ion (specifically, an alkali metal ion, such as potassium ion, or an alkaline earth metal ion, such as calcium ion or magnesium ion) as a gelation accelerator, and carrageenan, alginate, gellan gum, *azotobacter vinelandii* gum, pectin, carboxymethylcellulose sodium salt, or the like, as a gelation agent".

Examples of the starch include wheat starch, cassava starch, rice starch, glutinous rice starch, corn starch, waxy corn starch, sago starch, potato starch, arrowroot starch, lotus root starch, green bean starch, sweet potato starch, waxy potato starch, waxy cassava starch, and waxy wheat starch.

The binder preferably contains a polysaccharide containing a thermally irreversible gel-forming polysaccharide and a thermally reversible gel-forming polysaccharide, and a gelation retarder.

Thermally Irreversible Gel-Forming Polysaccharide

Here, the thermally irreversible gel is a gel that maintains a gelled state even when heated, once the gel is formed (in this paragraph, the term "gel" refers to one that contains at least water and a thermally irreversible gel-forming polysaccharide and that exhibits a behavior as an elastic solid).

The thermally irreversible gel-forming polysaccharide is a polysaccharide that forms a thermally irreversible gel.

The thermally irreversible gel-forming polysaccharide is preferably a polysaccharide that is crosslinked by a reaction with a cation, from the viewpoint of solubility before gelation.

The cation as the gelation agent is preferably a metal ion having an ionic valence of two or more.

Examples of the metal ion include: a divalent metal ion, such as calcium ion, magnesium ion, iron ion (II), copper ion (II), zinc ion, or manganese ion; and a trivalent metal ion, such as aluminum ion or iron ion (III).

From the viewpoint of obtaining a stable crosslinked structure, the metal ion is preferably at least one selected from calcium ion, magnesium ion, or zinc ion, and more preferably calcium ion.

Examples of the thermally irreversible gel-forming polysaccharide include a polysaccharide having at least one selected from the group consisting of a carboxy group, a carboxylic acid anion group (—COO$^-$), a sulfo group, and a sulfonic acid anion group (—SO$_3^-$).

Examples of the thermally irreversible gel-forming polysaccharide include alginic acid, LM pectin, and LA gellan gum.

From the viewpoint of improving moldability and the heat resistance of the gel, the thermally irreversible gel-forming polysaccharide is preferably at least one selected from the group consisting of alginic acid and pectin.

The viscosity of a 1 mass % aqueous solution of the thermally irreversible gel-forming polysaccharide (aqueous solution containing 1% by mass of the thermally irreversible gel-forming polysaccharide with respect to the entire aqueous solution) is preferably from 10 mPa·s to 3000 mPa·s, and more preferably from 20 mPa·s to 1000 mPa·s.

The viscosity of the 1 mass % aqueous solution of the thermally irreversible gel-forming polysaccharide is a value measured by a tuning fork vibration viscometer under a temperature condition of 20° C.

As the tuning fork vibration viscometer, for example, SV-10 (manufactured by A & D) can be used.

The content of the thermally irreversible gel-forming polysaccharide is preferably from 10% by mass to 90% by mass, more preferably from 20% by mass to 80% by mass, and still more preferably from 30% by mass to 70% by mass, with respect to the entire binder.

(Thermally Reversible Gel-Forming Polysaccharide)

Here, the thermally reversible gel is a gel that maintains a gelled state at normal temperature (25° C.) (in this paragraph, the term "gel" refers to one that contains at least water and a thermally reversible gel-forming polysaccharide and that exhibits a behavior as an elastic solid) and is melted and liquefied (solated) when heated.

The thermally reversible gel-forming polysaccharide is a polysaccharide that forms a thermally reversible gel.

Examples of the thermally reversible gel-forming polysaccharide include agar, carrageenan, furcellaran, native gellan gum, locust bean gum, xanthan gum, guar gum, *psyllium* seed gum, glucomannan, tara gum, tamarind seed gum, and the like.

The thermally reversible gel-forming polysaccharide is preferably carrageenan from the viewpoint of maintaining the shape of the meat alternative after heat-cooking, and from the viewpoint of food texture.

The content of the thermally reversible gel-forming polysaccharide is preferably from 10% by mass to 90% by mass, more preferably from 20% by mass to 80% by mass, and still more preferably from 30% by mass to 70% by mass, with respect to the entire binder.

(Combination of Thermally Irreversible Gel-Forming Polysaccharide and Thermally Reversible Gel-Forming Polysaccharide)

Preferred combinations of the thermally irreversible gel-forming polysaccharide and the thermally reversible gel-forming polysaccharide include a combination in which the thermally irreversible gel-forming polysaccharide is at least one selected from the group consisting of alginic acid and pectin, and the thermally reversible gel-forming polysaccharide is carrageenan.

(Gelation Retarder)

The binder preferably contains a gelation retarder.

The gelation retarder is a compound having a function of suppressing gelation of the thermally irreversible gel-forming polysaccharide or the thermally reversible gel-forming polysaccharide.

From the viewpoint of maintaining the shape of the meat alternative after heat-cooking, and from the viewpoint of the food texture, the gelation retarder is preferably a compound having a function of suppressing gelation of the thermally irreversible gel-forming polysaccharide.

From the viewpoint of maintaining the shape of the meat alternative after heat-cooking, and from the viewpoint of the food texture, the gelation retarder is preferably a chelating agent.

As the chelating agent, known chelating agents can be suitably used.

Examples of the chelating agent include: an oxycarboxylic acid, such as tartaric acid, citric acid, or gluconic acid; an aminocarboxylic acid, such as iminodiacetic acid (IDA), nitrilotriacetic acid (NTA), or ethylenediaminetetraacetic acid (EDTA); a condensed phosphoric acid, such as pyrophosphoric acid or tripolyphosphoric acid; and a salt thereof.

Among them, the chelating agent is preferably a condensed phosphoric acid or a salt thereof, and more preferably pyrophosphoric acid or a pyrophosphate, from the viewpoint of maintaining the shape of the meat alternative after heat-cooking, the viewpoint of the food texture, and the viewpoint of the flavor of the meat alternative.

The content of the gelation retarder is preferably from 0.1% by mass to 20% by mass, more preferably from 0.5% by mass to 15% by mass, and still more preferably from 0.3% by mass to 10% by mass, with respect to the entire polysaccharides including the thermally irreversible gel-forming polysaccharide and the thermally reversible gel-forming polysaccharide.

The total content of the binder and the enzyme that hardens the protein contained in the lean meat-like portion is preferably from 0.1% by mass to 30% by mass, more preferably from 0.5% by mass to 25% by mass, and still more preferably from 1% by mass to 20% by mass, with respect to the entire lean meat-like portion.

—Other Additives—

The lean meat-like portion preferably contains additive(s) other than the protein, the oil and/or fat, and the binder, as necessary.

Examples of said other additive(s) include water, a seasoning, an acidulant, a bittering agent, a spice, a sweetener, an antioxidant, a colorant, a color former, a flavoring agent, a stabilizer, and a preservative.

The content of said other additive(s) is preferably from 0% by mass to 20% by mass.

—Aspects of Lean Meat-Like Portion—

The lean meat-like portion is preferably sponge-like or fibrous.

By making the lean meat-like portion sponge-like or fibrous, the raw meat-like meat alternative tends to have food texture similar to that of a chunk of meat.

Here, the expression "sponge-like" means having an isotropic porous structure in appearance. The expression "fibrous" means having an anisotropic fiber structure in appearance.

The isotropic porous structure refers to a structure in which the shapes of the pores in a cross-section when the lean meat-like portion is cut at an arbitrary position are substantially elliptical and are substantially the same regardless of the direction.

The anisotropic fiber structure refers to a structure in which the shapes of the pores in a cross-section when the lean meat-like portion is cut at an arbitrary position vary depending on the cutting direction, the shapes of the pores including a substantially elliptical shape and a substantially fibrous shape.

Examples of the method of observing the cut surface include a method of cutting out a section and observing the section with a microscope, and a method of observing the section with X-ray CT (Computed Tomography).

The protein contained in the lean meat-like portion is preferably produced by adding a raw material protein and water to an extruder and kneading and extruding the mixture. Since the temperature conditions for kneading and extruding are preferably equal to or higher than the boiling point of water, when extruded to atmospheric pressure immediately after the kneading, the protein is expanded owing to the boiled water to form a porous structure, and the lean meat-like portion forms a sponge-like shape.

On the other hand, when a shear stress is applied after the kneading and before the discharging at atmospheric pressure, the protein tends to be oriented in a fibrous form, and the lean meat-like portion forms fibrous shape.

The specific method for producing the lean meat-like portion will be described later.

When the lean meat-like portion is sponge-like or fibrous, a raw meat-like meat alternative having a food texture closer to a chunk of meat can be obtained.

Furthermore, from the viewpoint of obtaining a raw meat-like meat alternative having a food texture and an appearance close to those of a chunk of meat, it is more preferable that the lean meat-like portion is in a fibrous form.

(Hardness of Lean Meat-Like Portion)

The hardness of the lean meat-like portion is evaluated by toughness measured by the multi-byte test. The toughness measured by the multi-byte test is preferably from 1000 (gw·cm/cm 2) to 50000 (gw·cm/cm 2), more preferably from 1500 (gw·cm/cm 2) to 40000 (gw·cm/cm 2), and still more preferably from 2000 (gw·cm/cm 2) to 30000 (gw·cm/cm 2).

By setting the hardness (toughness in the multi-bite test) of the lean meat-like portion within the foregoing numerical ranges, the lean meat-like portion tends to have an elasticity close to that of lean meat contained in livestock meat.

Toughness measured by the multi-byte test is a value measured by a viscoelasticity tester. As the viscoelasticity tester, for example, TENSIPRESSER MyBpy2system (product name) manufactured by TAKETOMO ELECTRIC, Inc. can be used.

Hereinafter, the method of measuring the toughness by the multi-byte test will be specifically described.

The multi-byte test is used as a method for measuring the toughness. A sample is cut into a size of 30 mm square and a thickness of 5 mm. The sample is set on the stage of the viscoelasticity tester, and measured three times under the measurement conditions of the multi-byte test, and the average value thereof is obtained as a measured value.

(Fat-Like Portion)

The fat-like portion refers to a portion having an appearance similar to fat (which is, in general, a part also referred to as fatty meat) of a chunk of meat.

The fat-like portion contains an oil and/or fat, and preferably contains a gel as necessary.

—Oil and/or Fat—

Examples of the oil and/or fat include a vegetable oil and/or fat and an animal oil and/or fat.

Examples of the vegetable oil and/or fat include rapeseed oil, soybean oil, palm oil, olive oil, coconut oil, rice oil, corn oil, and the like. The vegetable oil and/or fat refers to an oil and/or fat obtained from a plant.

Examples of the animal oil and/or fat include beef tallow, pork tallow, lard, spermaceti, and fish oil. The animal oil and/or fat refers to an oil and/or fat obtained from an animal.

The melting point of the oil and/or fat is preferably 10° C. or higher, more preferably 12° C. or higher, and still more preferably 15° C. or higher.

When the melting point of the oil and/or fat is 10° C. or higher, the oil and/or fat is prevented from melting and flowing out from the surface of the raw meat-like meat alternative, and the fat-like portion is easily maintained.

The upper limit of the melting point of the oil and/or fat is not particularly limited, and may be, for example, 300° C. or lower.

The melting point of the oil and/or fat is a value measured by thermal analysis measurement apparatus.

As the thermal analysis measurement apparatus, for example, SSC5000DSC200 manufactured by SEIKO DENSHI KOGYO can be used.

The melting point of the oil and/or fat is measured by adding 3 mg of the sample to the apparatus and measuring the melting point at a heating rate of 3° C./min.

—Emulsion—

The oil and/or fat is preferably contained in the fat-like portion in the form of an emulsion.

In the present specification, the term "emulsion" refers to an emulsion that contains an oil and/or fat and water and that is in an emulsified state, such as an oil-in-water emulsion and a water-in-oil emulsion.

Examples of the oil and/or fat contained in the emulsion include the same ones as those described above.

The content of the oil and/or fat in the emulsion is preferably from 5% by mass to less than 90% by mass, more preferably from 10% by mass to 80% by mass, and still more preferably from 15% by mass to 70% by mass, with respect to the entire emulsion.

The water contained in the emulsion may be any water that can be used for food, and is not particularly limited.

The content of water in the emulsion is preferably from 10% by mass to 95% by mass, more preferably from 20% by mass to 90% by mass, and still more preferably from 30% by mass to 85% by mass, with respect to the entire emulsion.

The emulsion preferably contains a thickening polysaccharide. By containing a thickening polysaccharide, the water retainability of the emulsion can be improved.

The thickening polysaccharide is not particularly limited, and those described above can be adopted.

The content of the thickening polysaccharide in the emulsion is preferably from 0.1% by mass to 5% by mass, and more preferably from 0.5% by mass to 3% by mass, with respect to the entire emulsion.

The emulsion preferably contains a protein. When the emulsion contains a protein, adhesion between the lean meat-like portion and the fat-like portion is improved.

The protein is not particularly limited, and the ones described above can be applied.

The content of the protein in the emulsion is preferably from 0.1% by mass to 10% by mass, and more preferably from 0.5% by mass to 5% by mass, with respect to the entire emulsion.

The emulsion may contain a surfactant.

Examples of the surfactant contained in the emulsion include an edible surfactant.

Examples of the edible surfactant include a glycerin fatty acid ester, a polyglycerin fatty acid ester, an organic acid monoglyceride, a sorbitan fatty acid ester, a propylene glycol fatty acid ester, a sucrose fatty acid ester, a polyglycerin condensed ricinoleic acid ester, and lecithin.

The glycerin fatty acid ester preferably contains a monoglyceride as a main component.

The monoglyceride is preferably a monoesterified product of glycerin and a saturated or unsaturated fatty acid having from 2 to 24 carbon atoms.

Examples of the fatty acid include behenic acid, stearic acid, and palmitic acid.

The glycerin fatty acid ester may contain a diglyceride.

The diglyceride is preferably a diesterified product of glycerin and a saturated or unsaturated fatty acid having from 2 to 24 carbon atoms.

The polyglycerin fatty acid ester is preferably an esterified product of polyglycerin and a saturated or unsaturated fatty acid having from 2 to 24 carbon atoms.

Specific examples of the polyglycerin fatty acid ester include polyglyceryl monomyristate, polyglyceryl dimyristate, polyglyceryl trimyristate, polyglyceryl monopalmitate, polyglyceryl dipalmitate, polyglyceryl tripalmitate, polyglyceryl monostearate, polyglyceryl distearate, polyglyceryl tristearate, polyglyceryl monoisostearate, polyglyceryl diisostearate, polyglyceryl triisostearate, polyglyceryl monooleate, polyglyceryl dimonooleate, and polyglyceryl trimonooleate.

The organic acid monoglyceride is obtained by esterifying a hydroxyl group derived from the glycerin of a monoglyceride further using an organic acid.

Examples of the organic acid include citric acid, succinic acid, acetic acid, and lactic acid, and citric acid and succinic acid are preferable, and citric acid is more preferable.

The sorbitan fatty acid ester refers to an esterified product of sorbitan and a fatty acid.

The sorbitan fatty acid ester is preferably an esterified product of sorbitan and a saturated or unsaturated fatty acid having from 2 to 18 carbon atoms.

Specific examples of the sorbitan fatty acid ester include sorbitan monocaprate, sorbitan monolaurate, sorbitan monopalmitate, sorbitan monostearate, sorbitan distearate, sorbitan sesquistearate, sorbitan tristearate, sorbitan trioleate, sorbitan monoisostearate, sorbitan sesquiisostearate, sorbitan monooleate, sorbitan sesquioleate, and sorbitan coconut oil fatty acid.

The propylene glycol fatty acid ester is an esterified product of a fatty acid and propylene glycol.

As the fatty acid used for the synthesis of the propylene glycol fatty acid ester, a saturated or unsaturated fatty acid having from 2 to 24 carbon atoms is preferable.

Specific examples of the propylene glycol fatty acid ester include propylene glycol palmitate, propylene glycol stearate, and propylene glycol behenate.

The sucrose fatty acid ester is an esterified product of sucrose and a fatty acid.

As the fatty acid used for the synthesis of the sucrose fatty acid ester, a saturated or unsaturated fatty acid having from 2 to 24 carbon atoms is preferable.

The sucrose fatty acid ester is preferably an esterified product of sucrose and one or more fatty acids selected from the group consisting of caprylic acid, capric acid, lauric acid, myristic acid, palmitic acid, palmitoleic acid, stearic acid, oleic acid, arachidic acid, and behenic acid.

The polyglycerin condensed ricinoleic acid ester is an esterified product of a polyglycerin fatty acid ester and a ricinoleic acid condensate.

Specific examples of the polyglycerin condensed ricinoleic acid ester include an esterified product of a ricinoleic acid condensate and the compounds described above as specific examples of the polyglycerin fatty acid ester.

Lecithin refers to phosphatidylcholine itself or a mixture containing at least phosphatidylcholine.

The mixture containing at least phosphatidylcholine is generally a mixture that may contain phosphatidylserine, phosphatidylethanolamine, phosphatidylinositol, N-acylphosphatidylethanolamine, phosphatidylglycerol, phosphatidic acid, lysophosphatidylcholine, lysophosphatidic acid, sphingomyelin, sphingoethanolamine, or the like, in addition to the phosphatidylcholine.

As the lecithin, enzymatically decomposed lecithin (so-called lysolecithin) can be used.

The enzymatically decomposed lecithin is a composition containing lysophosphatidylcholine, in which one fatty acid possessed by a phosphatidylcholine molecule is lost by an enzyme such as phospholipase. In the oil-in-water emulsion composition according to the present disclosure, the enzymatically decomposed lecithin includes so-called hydrogenated enzymatically decomposed lecithin, in which the oxidation stability is improved by hydrogenating the conjugated fatty acid to obtain a saturated fatty acid.

The HLB value of the surfactant is, for example, preferably 8 or more, more preferably 10 or more, and still more preferably 12 or more, from the viewpoint of emulsion dispersibility.

The upper limit of the HLB value of the emulsifier is not particularly limited, but is generally 20 or less, and preferably 18 or less.

Therefore, the HLB value of the surfactant is preferably from 8 to 20, more preferably from 10 to 18, and still more preferably from 12 to 18.

The HLB indicates the hydrophilic-hydrophobic balance generally used in the field of surfactants. The HLB value is calculated using the following Kawakami's equation. When a commercially available product is used as the surfactant, commercially available catalog data is preferentially adopted.

$$HLB = 7 + 11.7 \log(Mw/Mo)$$

Here, Mw represents the formula amount of the hydrophilic group of the surfactant, and Mo represents the formula amount of the hydrophobic group of the surfactant.

The hydrophobic group of the surfactant is an atomic group having low affinity for water. Examples of the hydrophobic group include an alkyl group, an alkenyl group, an alkylsilyl group, and a perfluoroalkyl group. Specifically, when the surfactant is the "glycerin fatty acid ester, polyglycerin fatty acid ester, organic acid monoglyceride, sorbitan fatty acid ester, propylene glycol fatty acid ester, sucrose fatty acid ester, polyglycerin condensed ricinoleic acid ester, or lecithin" described above, the hydrophobic group refers to an alkyl group or an alkenyl group derived from a fatty acid.

The hydrophilic group of the surfactant is an atomic group having high affinity for water. Specifically, the hydrophilic group refers to an atomic group other than the hydrophobic group in the structure of the surfactant.

—Gel—

From the viewpoint of preventing the oil and/or fat contained in the fat-like portion from flowing out and maintaining the appearance similar to that of a chunk of meat more favorably even when there is a temperature change or the like, and from the viewpoint of more easily obtaining the food texture similar to that of a chunk of meat, it is preferable that the fat-like portion contains a gel.

The gel refers to one that contains at least water and that exhibits a behavior as an elastic solid.

The elasticity refers to a property of an object deformed by receiving an external force to return to the original shape after the external force is removed.

The gel preferably contains an edible gelation agent.

Examples of the edible gelation agent include a thickening polysaccharide.

Specific examples of the thickening polysaccharide include agar, carrageenan carrageenan, t-carrageenan), alginic acid, alginate, agarose, furcellaran, gellan gum, gluconodeltalactone, *azotobacter vinelandii* gum, xanthan gum, pectin, guar gum, locust bean gum, tara gum, *cassia* gum, glucomannan, tragacanth gum, karaya gum, pullulan, gum arabic, arabinogalactan, dextran, carboxymethylcellulose sodium salt, methyl cellulose, *psyllium* seed gum, starch, chitin, chitosan, curdlan, tamarind seed gum, soybean polysaccharide, gelatin, *psyllium*, hydroxypropyl methyl cellulose, hydroxy ethylcellulose, carboxymethylcellulose, and dextrin.

The gelation agent is preferably used together with a gelation accelerator.

The gelation accelerator is a compound that accelerates gelation upon contacting with the gelation agent, and exhibits its function by a specific combination with the gelation agent.

Preferred combinations of the gelation agent and the gelation accelerator are as follows.

1) A combination of a polyvalent metal ion (specifically, an alkali metal ion, such as potassium ion, or an alkaline earth metal ion, such as calcium ion and magnesium ion) as a gelation accelerator, and carrageenan, alginate, gellan gum, *azotobacter vinelandii* gum, pectin, carboxymethylcellulose sodium salt, or the like, as a gelation agent.
2) A combination of boric acid or another boron compound as a gelation accelerator, and guar gum, locust bean gum, tara gum, cacia gum, or the like, as a gelation agent.
3) A combination of an acid or an alkali as a gelation accelerator, and alginate, glucomannan, pectin, chitin, chitosan, curdlan, or the like, as a gelation agent.
4) A water-soluble polysaccharide that reacts with the gelation agent to form a gel is used as the gelation accelerator. Examples thereof include a combination in which xanthan gum is used as a gelation agent and cacia gum is used as a gelation accelerator, and a combination in which carrageenan is used as a gelation agent and locust bean gum is used as a gelation accelerator.

From the viewpoint of obtaining a raw meat-like meat alternative having an appearance and food texture similar to a chunk of meat, the combination of the gelation agent and the gelation accelerator is preferably "1) the combination of a polyvalent metal ion (specifically, an alkali metal ion, such as potassium ion, or an alkaline earth metal ion, such as calcium ion and magnesium ion) as a gelation accelerator, and carrageenan, alginate, gellan gum, *azotobacter vinelandii* gum, pectin, carboxymethylcellulose sodium salt, or the like, as a gelation agent".

—Aspects of Components Contained in Fat-Like Portion—

The fat-like portion is preferably present in accordance with any of the following aspects of components.

(1) The fat-like portion contains an oil and/or fat as a main component.

(2) The fat-like portion contains an emulsion as a main component.

(3) The fat-like portion contains an oil and/or fat and a gel.

Here, the term "main component" means that the corresponding component is contained in an amount of 90% by mass or more with respect to the entire fat-like portion.

(1) The Case in which the Fat-Like Portion Contains an Oil and/or Fat as a Main Component (Hereinafter, Referred to as Fat-Like Portion Example (1))

When the fat-like portion is present in accordance with the "fat-like portion example (1)", the content of the oil and/or fat contained in the fat-like portion is preferably 90% by mass or more, more preferably 92% by mass or more, and still more preferably 95% by mass or more, with respect to the entire fat-like portion.

When the fat-like portion is present in accordance with the "fat-like portion example (1)", the upper limit of the content of the oil and/or fat contained in the fat-like portion may be 99% by mass or less, or may be 98% by mass or less, with respect to the entire fat-like portion, considering the additives and the like contained in the oil and/or fat.

When the fat-like portion is present in accordance with the "fat-like portion example (1)", it is preferable to use an oil and/or fat that turns white upon coagulation, from the viewpoint of obtaining a raw meat-like meat alternative having an appearance similar to a chunk of meat.

Specifically, coconut oil, palm oil, shea butter, cocoa butter, and the like are preferable as the oil and/or fat used when the fat-like portion is present in accordance with the "fat-like portion example (1)".

(2) the Case in which the Fat-Like Portion Contains an Emulsion as a Main Component (Hereinafter, Referred to as Fat-Like Portion Example (2))

Since an emulsion often exhibits a white color, when the fat-like portion contains an emulsion as a main component, the fat-like portion also tends to be white. Therefore, when the fat-like portion is present in accordance with the aspect of the fat-like portion example (2), a raw meat-like meat alternative having an appearance closer to a chunk of meat is obtained.

The emulsion may be an oil-in-water emulsion and may be a water-in-oil emulsion.

When the fat-like portion is present in accordance with the "fat-like portion example (2)", the content of the emulsion is preferably 90% by mass or more, more preferably 92% by mass or more, and still more preferably 95% by mass or more, with respect to the entire fat-like portion.

When the fat-like portion is present in accordance with the "fat-like portion example (2)", the upper limit of the content of the emulsion contained in the fat-like portion may be 99% by mass or less, or may be 98% by mass or less, with respect to the entire fat-like portion, in consideration of the addition of additives and the like.

The content of the oil and/or fat contained in the emulsion is preferably from 5% by mass to less than 90% by mass, more preferably from 10% by mass to 80% by mass, and still more preferably from 15% by mass to 70% by mass, with respect to the entire emulsion.

The content of water contained in the emulsion is preferably from 10% by mass to 95% by mass, more preferably from 20% by mass to 90% by mass, and still more preferably from 30% by mass to 85% by mass, with respect to the entire emulsion.

The content of the surfactant contained in the emulsion is preferably from 0.01% by mass to 5% by mass, more preferably from 0.05% by mass to 4% by mass, and still more preferably from 0.1% by mass to 3% by mass, with respect to the entire emulsion.

(3) the Case in which the Fat-Like Portion Contains an Oil and/or Fat and a Gel (Hereinafter, Referred to as Fat-Like Portion Example (3))

When the fat-like portion contains an oil and/or fat and a gel, the oil and/or fat contained in the fatty meat-like portion is easily retained by the gel even if there is a temperature change or the like. Therefore, even if there is a temperature change, the oil and/or fat is less likely to flow out from the fat-like portion, and the appearance similar to a chunk of meat is more likely to be maintained. In addition, even when the raw meat-like meat alternative is heat-cooked, the oil and/or fat is easily retained by the gel, and when the cooked raw meat-like meat alternative is consumed, the oil and/or fat contained in the fatty meat-like portion flows out, whereby the food texture similar to that of a cooked chuck of meat can be more favorably obtained.

From the viewpoint that the oil and/or fat is less likely to flow out from the fatty meat-like portion, when the fat-like portion is present in accordance with the aspect of the fat-like portion example (3), the oil and/or fat is preferably encapsulated in the gel.

When the oil and/or fat is encapsulated in the gel, it is preferable that a large number of near-spherical droplets of oil and/or fat (hereinafter, referred to as "oil droplets") are dispersed in the gel.

The particle size of the oil droplets is preferably from 20 μm to 500 μm, more preferably from 30 μm to 400 μm, and still more preferably from 50 μm to 300 μm.

When the oil and/or fat is encapsulated in the gel, even if the raw meat-like meat alternative is formed and then the raw meat-like meat alternative is heat-sterilized, the oil and/or fat contained in the fat-like portion is prevented from melting and flowing down from the fat-like portion. Therefore, even when the raw meat-like meat alternative is heat-sterilized, the fat-like portion can be retained, and the preservability of the raw meat-like meat alternative in terms of hygiene can be improved.

The particle size of the oil droplets is measured by observing the fat-like portion with a transmission optical microscope.

As the transmission microscope, for example, inverted microscope Axio Observer. Z1 (product name) manufactured by Carl Zeiss AG can be used.

Hereinafter, the procedure for measuring the particle size of oil droplets will be described.

While the fat and/or oil is in a solid state at a temperature at or below the melting point thereof, oil droplets are recovered from the fat-like portion by dissolving the gel using 3% sodium carbonate or the like, and are placed on a polystyrene petri dish having a diameter of 60 mmΦ. This is carried out in such a manner that the recovered oil droplets do not overlap each other in the depth direction of the petri dish. Then, the oil droplets recovered in the petri dish are observed with a transmission optical microscope and photographed at an objective magnification of five times. Two hundred or more images of oil droplets included in a screen obtained by the photographing are selected, and the circle equivalent diameter (the diameter of a perfect circle corresponding to the area of the oil droplet image) of each of the oil droplets is calculated by image processing software (for example, ImageJ). An arithmetic average value of the calculated circle equivalent diameters of the droplets is calculated, and the arithmetic average value is defined as a particle diameter of the oil droplets.

When the fat-like portion contains an oil and/or fat encapsulated in a gel, it is preferable that the transparency of the fat-like portion is increased by heating.

Fat contained in a chunk of meat has a color close to white when in the state of raw meat, while it increases its transparency when heat-cooked. Therefore, when the raw meat-like meat alternative according to this embodiment has the foregoing configuration, the raw meat-like meat alternative tends to be able to have an appearance close to that of a chunk of meat when heat-cooked.

Whether or not the transparency of the fat-like portion is increased by heating is determined by the following procedure.

The transparency of the fat-like portion of the raw meat-like meat alternative is measured using Color Reader CR-10Plus, manufactured by KONICA MINOLTA, INC., at three freely selected different locations, and the arithmetic average value of the obtained values is defined as measured value A. The raw meat-like meat alternative is placed on a hot plate having a surface temperature of 160° C., with the surface including the measurement sites facing downward, and left to stand for 2 minutes to be heated. The heated raw meat-like meat alternative is taken out from the hot plate, and the transparency of the measurement sites after heating is measured by the same procedure as that of measured value A. The arithmetic average value of the obtained values is defined as measured value B. When the measured value B shows a result of a higher transparency than the measured value A, it is determined that the transparency of the fat-like portion has been increased by heating.

When the fat-like portion is present in accordance with the "fat-like portion example (3)", the content of the oil and/or fat is preferably from 10% by mass to 70% by mass, more preferably from 15% by mass to 60% by mass, and still more preferably from 20% by mass to 50% by mass, with respect to the entire fat-like portion.

When the fat-like portion is present in accordance with the "fat-like portion example (3)", the content of the gel is preferably from 30% by mass to 90% by mass, more preferably from 40% by mass to 85% by mass, and still more preferably from 50% by mass to 80% by mass, with respect to the entire fat-like portion.

—Shape of Fat-Like Portion—

The area of the fat-like portion on the surface (hereinafter may be simply referred to as "surface area ratio of the fat-like portion") is 3% or more with respect to the entire surface area.

The surface area ratio of the fat-like portion is measured by the following procedure.

First, the surface of the meat alternative is photographed with a digital camera. At this time, the entire image of the meat alternative is to be included in the captured image, and the direction of capturing the meat alternative is arbitrary. The photographing conditions are as follows.

Photographing Conditions

Digital camera: manufactured by FUJIFILM Corporation, product name: GFX100

Lens: GF63 mmF2.8R WR

Photographing mode: monochrome

Diaphragm value: F4

Shutter speed: 1/30

ISO sensitivity: 100

Light intensity on the surface of the meat alternative: EV=9 1280 lux

Background at the time of photographing: white

The obtained image of the meat alternative is accessed with Photoshop (registered trademark, manufactured by Adobe), and pixels having a gray value level that exceeds the half level are converted into white, and pixels below this level are converted into black. Within this image, the image of the meat alternative is specified. The percentage of the area of the white portion in the image of the meat alternative is calculated, assuming that the area of the image of the meat alternative is 100, and the obtained percentage is defined as the surface area ratio of the fat-like portion.

The surface area ratio of the fat-like portion is preferably varied according to the type of the chunk of meat to be imitated.

For example, in a case in which the chunk of meat to be imitated is a chunk of meat of a portion with little fat, such as beef fillet or pork fillet, the surface area ratio of the fat-like portion is preferably from 3% to 20%, and preferably from 3% to 15%.

In addition, for example, in a case in which the chunk of meat to be imitated is a chunk of meat of a portion having a large amount of fat, such as beef rib, sirloin, or pork rib, the surface area ratio of the fat-like portion is preferably from 20% to 60%, and preferably from 30% to 50%.

The fat-like portion on the surface includes a portion having a minor axis of 1 mm and having a major axis of 3.0 or more times the minor axis.

From the viewpoint of obtaining a raw meat-like meat alternative having an appearance more similar to a chunk of meat, the minor axis of the fat-like portion on the surface is preferably from 1.1 mm to 5 mm, more preferably from 1.2 mm to 4 mm, and still more preferably from 1.3 mm to 3 mm.

From the viewpoint of obtaining a raw meat-like meat alternative having an appearance more similar to a chunk of meat, the major axis of the fat-like portion on the surface is preferably 4.0 or more times the minor axis, and more preferably 5.0 or more times the minor axis.

Here, the upper limit of the major axis of the fat-like portion on the surface is not particularly limited, and may be the same length as any side of the surface of the raw meat-like meat alternative.

Furthermore, from the viewpoint of obtaining a raw meat-like meat alternative having an appearance similar to a chunk of meat, the fat-like portion preferably has a branched shape.

Having a branched shape means having a shape in which fat-like portions that extend in different directions intersect with each other.

Examples of the fat-like portion having a branched shape include a fat-like portion including plural portions that has a minor axis of 1 mm or more and that has a major axis of 3.0 times or more the minor axis, and having a shape in which the portions that has a minor axis of 1 mm or more and that has a major axis of 3.0 times or more the minor axis intersect with each other.

The procedure for measuring the major axis and minor axis of the fat-like portion on the surface will be described with reference to FIGS. 2 to 5. Each of FIGS. 2 to 5 is a schematic front view showing an example of a raw meat-like meat alternative having a lean meat-like portion and a fat-like portion.

The major axis and minor axis of the fat-like portion are measured on the surface of the raw meat-like meat alternative enclosed by a square of 4 cm long and 4 cm wide (hereinafter, also referred to as "unit area") within the surface of the raw meat-like meat alternative subjected to the measurement. The position of the unit area is not particularly limited as long as the entire region of the unit area is included within the surface of the raw meat-like meat alternative to be measured.

In the surface of the raw meat-like meat alternative, among ellipses inscribed in the fat-like portion included in the unit area, the lengths of the major axis (the length between points A and B in FIGS. 2 to 5) and the minor axis (the length between points C and D in FIGS. 2 to 5) of the ellipse having the largest area are measured (refer to FIGS. 2 to 5).

Here, the ellipse inscribed in the fat-like portion refers to an ellipse in which the entire area of the ellipse is included within the fat-like portion on the surface of the raw meat-like meat alternative, and at least a part of the outer periphery of the ellipse is in contact with the boundary line between the fat-like portion and the lean meat-like portion on the surface of the raw meat-like meat alternative (here, an ellipse is a curve formed from a series of points at which the sum of distances from two focal points is constant).

The major axis of an ellipse refers to the length of a line segment, included inside the ellipse, of the straight line that passes through the two focal points (that is, the length between point A and point B in FIGS. 2 to 5).

The minor axis of an ellipse refers to the length of a line segment, included inside the ellipse, of the perpendicular bisector of the above line segment included inside the ellipse (that is, the length between point C and point D in FIGS. 2 to 5).

The major axis measured (that is, the length between point A and point B in FIGS. 2 to 5) of the ellipse is defined as the major axis of the fat-like portion. Further, the minor axis measured (that is, the length between point C and point D in FIGS. 2 to 5) of the ellipse is defined as the minor axis of the fat-like portion.

Therefore, when the measured minor axis of the ellipse is 1 mm or more and the measured major axis of the ellipse is 3.0 or more times the measured minor axis of the ellipse, it can be deemed that the fat-like portion on the surface includes a portion having a minor axis of 1 mm or more and having a major axis of 3.0 or more times the minor axis.

The depth of the fat-like portion on the surface is preferably 100 μm or more, more preferably 150 μm or more, and still more preferably 200 μm or more.

By the fat-like portion on the surface having a depth of 100 μm or more, a raw meat-like meat alternative having an appearance more similar to a chunk of meat is obtained.

The depth of the fat-like portion on the surface is measured by the observation with a reflective optical microscope.

As the reflective optical microscope, for example, inverted microscope Axio Observer. Z1 (product name) manufactured by Carl Zeiss AG can be used.

The procedure for measuring the depth of the fat-like portion on the surface will be described below.

The fat-like portion to be observed is cut in the direction perpendicular to the surface of the fat-like portion. At this time, the fat-like portion is cut by applying a force in the direction parallel to the surface of the fat-like portion so as not to apply a force in the direction perpendicular to the surface of the fat-like portion. The cut surface is observed with a microscope, and the length of the fat-like portion in the direction perpendicular to the surface of the fat-like portion is measured and defined as the depth of the fat-like portion.

It is preferable that an oil and/or fat encapsulated in a gel is contained inside the raw meat-like meat alternative.

Here, the term "inside" means that it is not present on the surface of the raw meat-like meat alternative.

When the an oil and/or fat encapsulated in a gel is contained inside the raw meat-like meat alternative, the oil and/or fat tends to remain in the raw meat-like meat alternative. Therefore, a raw meat-like meat alternative in which a food texture close to that of livestock meat is maintained tends to be more easily obtained.

Here, as the oil and/or fat that is encapsulated in a gel and that is contained inside the raw meat-like meat alternative, the same ones as the oil and/or fat contained in the fat-like portion can be adopted.

In addition, as the gel that encapsulates the oil and/or fat and that is contained inside the raw meat-like meat alternative, the same ones as the gel contained in the fat-like portion can be adopted.

(Appearance of Raw Meat-Like Meat Alternative)

Examples of the appearance of the raw meat-like meat alternative according to the present disclosure are shown in FIGS. 7 to 14.

FIGS. 7 to 10 are photographs of the external appearances showing examples of the surface of the raw meat-like meat alternative when viewed from the top in the thickness direction.

FIGS. 11 to 14 are photographs of the external appearances showing examples of the surface of the raw meat-like meat alternative when a side of the raw meat-like meat alternative according to the present disclosure is viewed from a side thereof, changing the angle every 90°.

In the raw meat-like meat alternative according to the present disclosure, for example, by selecting a top view of the appearance of the raw meat-like meat alternative from FIGS. 7 to 10, selecting a side view of the appearance of the raw meat-like meat alternative from FIGS. 11 to 14, and combining them, plural kinds of raw meat-like meat alternatives having different appearances can be produced.

(Integrated Orientation Degree and Standard Deviation of Orientation Angle of Fiber Direction in Cross Section of Raw Meat-Like Meat Alternative)

In the raw meat-like meat alternative according to the present disclosure, the integrated orientation degree of the fiber direction in a cross section in the direction parallel to the fiber axis direction of the fibrous bundle-like organized protein is preferably 1.1 or more. In the raw meat-like meat alternative according to the present disclosure, the standard deviation of orientation angle of the fiber direction in a cross section in the direction parallel to the fiber axis direction of the fibrous bundle-like organized protein is preferably 20 or less.

Hereinafter, the "integrated orientation degree of the fiber direction in a cross section in the direction parallel to the fiber axis direction of the fibrous bundle-like organized protein" is also simply referred to as "integrated orientation degree".

The "standard deviation of orientation angle of the fiber direction in a cross section in the direction parallel to the fiber axis direction of the fibrous bundle-like organized protein" is also simply referred to as "standard deviation of orientation angle".

From the viewpoint of the appearance, cross section, and food texture, the integrated orientation degree is preferably 1.1 or more, more preferably 1.15 or more, and still more preferably 1.2 or more.

The standard deviation of orientation angle is preferably 20 or less, more preferably 15 or less, and still more preferably 10 or less.

The integrated orientation degree and the standard deviation of orientation angle of the raw meat-like meat alternative are calculated by the method of Non-Patent Document 1 from an image obtained by photographing a cross section of the raw meat-like meat alternative.

Non-Patent Document 1: Enomae, T., Han, Y-H. and Isogai, A., "Nondestructive determination of fiber orientation distribution of paper surface by image analysis", Nordic Pulp and Paper Research Journal 21(2): 253-259(2006). http://www.enomae.com/publish/pdf/2006NPPRJ_Fibre-Orientation.pdf (Method of Measuring Integrated Orientation Degree and Standard Deviation of Orientation Angle of Raw Meat-Like Meat Alternative)

Specifically, the integrated orientation degree and the standard deviation of orientation angle are calculated as follows.

(Cross-Sectional Imaging)

A cross section is exposed by cutting the raw meat-like meat alternative along the thickness direction thereof, and the cross section of the raw meat-like meat alternative is photographed under the following conditions. At this time, a cross section exposed by cutting the raw meat-like meat alternative along the direction parallel to the fiber axis direction of the fibrous bundle-like organized protein is photographed. The photographing is performed 25 times while the photographing positions are changed to obtain a total of 25 cross-sectional images of the raw meat-like meat alternative.

Photographing Conditions
  Digital camera: manufactured by FUJIFILM Corporation, product name: GFX100
  Lens: GF63 mmF2.8R WR
  Photographing mode: monochrome
  Diaphragm value: F4
  Shutter speed: 1/30
  ISO sensitivity: 100
  Light intensity on the surface of the meat alternative: EV=9 1280 lux
  Background at the time of photographing: white From each of the 25 cross-sectional images obtained by the photographing, one portion corresponding to a region of a square having a side of 25 mm is cut out as a unit area from the cross section of the raw meat-like meat alternative, and is converted into 512×512 pixels. One unit area is cut out per cross-sectional image to obtain a total of 25 unit areas.

Subsequently, the integrated orientation degree and the standard deviation of orientation angle are calculated from the 25 unit areas obtained by the above procedure as follows.

Calculation of the Integrated Orientation Degree

An image of a unit area is subjected to Fourier transform and polar coordinate transform on the basis of Non-Patent Document 1 to be converted into an amplitude spectrum. Twenty-five of the converted amplitude spectra are integrated and subjected to approximation to generate an approximate ellipse. An orientation degree is calculated from the approximate ellipse, the value of which is defined as the integrated orientation degree.

Calculation of the Standard Deviation of Orientation Angle

An image of a unit area is subjected to Fourier transform and polar coordinate transform on the basis of Non-Patent Document 1 to be converted into an amplitude spectrum, and an approximate ellipse is obtained from the obtained data. One approximate ellipse is obtained from one unit area, and a total of 25 approximate ellipses are obtained.

The orientation degrees of the approximate ellipses are calculated, and the standard deviation of the values is defined as the standard deviation of orientation angle.

Here, if the orientation angle is around 0° (or 180°), the standard deviation becomes large. Therefore, the direction of the photographing or the images is adjusted such that the stretching direction, the orientation direction visually recognized, or the orientation direction obtained by a temporary measurement is set to a near-vertical direction, that is, the orientation angle is set between 45° and 135°, and thereby the standard deviation is calculated.

For calculating the integrated orientation degree and the standard deviation of orientation angle, a non-destructive paper surface fiber orientation analysis program FiberOri8single03.exe. is used. As the non-destructive paper surface fiber orientation analysis program, the following website may also be used.

http://www.enomae.com/FiberOri/index.htm

Here, in a case in which the size of the raw meat-like meat alternative is less than 25 mm, the same raw meat-like meat alternatives are aligned such that the orientation of the fiber direction is in the same direction, so that the raw meat-like meat alternatives have a size of 25 mm or more, and thereafter the photographing and calculation of the integrated orientation degree and the standard deviation of orientation angle are performed.

Figure 15:
FIG. 15 is a schematic front view showing an example of a cross section of a raw meat-like meat alternative according to the present disclosure.

As an example of the integrated orientation degree and the standard deviation of orientation angle, an example of a cross section of a raw meat-like meat alternative according to the present disclosure is shown in FIG. 15. FIG. 15 is an example in which the integrated orientation degree is 1.35 and the orientation angle is 98°.

<Method for Producing Raw Meat-Like Meat Alternative>

The method for producing a raw meat-like meat alternative according to the present disclosure preferably includes: forming a lean meat-like portion having a red color and forming a groove having a depth of 100 μm or more from a surface of the lean meat-like portion, or forming a lean meat-like portion having a red color while forming a groove having a depth of 100 μm or more from a surface of the lean meat-like portion (step of forming a lean meat-like portion); and thereafter depositing an oil and/or fat in the groove to form a fat-like portion (step of forming a fat-like portion).

(Step of Forming Lean Meat-Like Portion)

The step of forming a lean meat-like portion is a step of forming a lean meat-like portion having a red color and forming a groove having a depth of 100 μm or more from a surface of the lean meat-like portion, or forming a lean meat-like portion having a red color while forming a groove having a depth of 100 μm or more from a surface of the lean meat-like portion.

Examples of the procedure for forming a lean meat-like portion having a red color include the following procedures.

Procedure (1-1): A raw material of the lean meat-like portion containing at least a protein is extruded from an extruder, and the extruded raw material of the lean meat-like portion is colored red, and then molded into a shape that resembles the shape of lean meat of a chunk of meat.

Procedure (1-2): A commercially available soybean meat is colored with a red colorant, and the colored meat alternative is molded into a shape that resembles the shape of lean meat of a chunk of meat.

Procedure (1-3): A raw material of the lean meat-like portion containing at least a protein and a colorant is extruded from an extruder, and the extruded red-colored lean meat-like portion is molded into a shape that resembles the shape of lean meat of a chunk of meat.

Procedure (1-4): A commercially available soybean meat having a red color is molded into a shape that resembles the shape of lean meat of a chunk of meat.

Hereinafter, the procedures (1-1) to (1-4) will be described in detail.

—Procedure (1-1)—

Raw Material of Lean Meat-Like Portion

The raw material of the lean meat-like portion includes at least a protein, and preferably further includes water from the viewpoint of improving the extrusion efficiency of the raw material of the lean meat-like portion from an extruder.

As the raw material of the lean meat-like portion, it is preferable that from 2 parts by mass to 30 parts by mass of water is contained with respect to 10 parts by mass of the protein.

Extrusion Conditions

The extruder is not particularly limited, and a known single screw extruder, a non-meshing counter-rotating twin screw extruder, a meshing counter-rotating twin screw extruder, or a meshing co-rotating twin screw extruder can be used.

As for the barrel temperature of the extruder, the temperature of the barrel front half portion (the portion from the site from which the raw material of the lean meat-like portion is supplied to the center of the barrel) is preferably from 60° C. to 100° C., the temperature of the barrel center (the center of the length of the barrel in the axial direction) is preferably from 90° C. to 170° C., and the temperature of the barrel rear half portion (the portion from the center of the barrel to the tip of the barrel) is preferably from 140° C. to 180° C.

The extruder preferably has a die attached to the tip of the barrel.

The die is preferably a die with which a sheet-like extrudate is obtained.

The gap (lip clearance) of the discharge port of the die is preferably from 1 mm to 10 mm, and the shape may be a circular shape or a flat plate shape.

The length of the die is preferably 30 mm or more.

The die may be a cooling die. Here, the cooling die refers to a die to be cooled by, for example, circulation of a cooling liquid (water, glycol, or the like).

By using a cooling die, the swelling of the extruded raw material of the lean meat-like portion is easily suppressed. Accordingly, the lean meat-like portion produced using the raw material of the lean meat-like portion extruded using the cooling die tends to be fibrous.

When the cooling die is used, the temperature of the discharge port of the cooling die is preferably from 90° C. to 120° C.

Molding

The extruded raw material of the lean meat-like portion is preferably cut to be used, if necessary.

From the viewpoint of a raw meat-like meat alternative having an appearance similar to a chunk of meat, for example, it is preferable that the length of the extruded raw material of the lean meat-like portion in the extrusion direction is from 0.1 to 2 times the length of the raw meat-like meat alternative in the fiber direction (the length of the raw meat-like meat alternative in the extrusion direction when the raw meat-like meat alternative is produced by arranging the extrusion directions of the extruded raw materials of the lean meat-like portion in almost the same direction), and it is preferable that the length in the direction orthogonal to the extrusion direction is from 2 mm to 8 mm.

The extruded raw material of the lean meat-like portion is preferably colored red using a colorant.

The colorant is preferably an edible red colorant.

Examples of the colorant include natural beet red, cochineal extract, *gardenia* red, and the like, and among them, natural beet red is preferable.

Natural beet red has a property of being discolored by heating. Therefore, in the raw meat-like meat alternative obtained by using the natural beet red as a colorant, the lean meat-like portion exhibits a red color before heat-cooking, and exhibits a color close to brown after the heat-cooking, and a raw meat-like meat alternative having an appearance similar to a chunk of meat also in a cooking process is obtained.

It is preferable that a binder is added to the extruded raw material of the lean meat-like portion, and a seasoning may be added, if necessary.

The extruded raw material of the lean meat-like portion is gathered into a lump and molded into a shape similar to the shape of a chunk of meat to produce the lean meat-like portion of a raw meat-like meat alternative.

From the viewpoint of obtaining a raw meat-like meat alternative having a food texture closer to a chunk of meat, it is preferable that, when the extruded raw material of the lean meat-like portion is gathered into a lump, the extrusion directions of the extruded raw material of the lean meat-like portion are arranged in nearly the same direction.

Alternatively, the extrusion direction of the raw material of the inner lean meat-like portion may be arranged in the same direction by, for example, a method of gathering the extruded raw material of the lean meat-like portion into a lump and then flattening the lump by applying a pressure, or a method of passing the lump through a tubular space.

—Procedure (1-2)—

The procedure of forming a lean meat-like portion having a red color may be a procedure in which a commercially available soybean meat is colored with a red colorant, and the colored meat alternative is molded into a shape that resembles the shape of lean meat of a chunk of meat.

The soybean meat refers to a food material that is artificially produced using a raw material containing a soybean-derived vegetable protein, and that has a food texture close to that of livestock meat.

The soybean meat is preferably cut to be used, if necessary.

From the viewpoint of obtaining a raw meat-like alternative having an appearance similar to a chunk of meat, it is preferable that the size is adjusted such that, for example, the longitudinal width in the case of fibrous soybean meat is from 0.1 to 2 times the length of the raw meat-like meat alternative in the fiber direction (when the raw meat-like meat alternative is produced by aligning the structures similar to a fiber bundle of soybean meat in nearly the same directions, the length of the raw meat-like meat alternative in the direction of the structures similar to the fiber bundle), the width is from 2 mm to 8 mm, and the thickness is from 1 mm to 5 mm.

In the case of a sponge-like soybean meat, it is preferable that the soybean meat is prepared by tearing the soybean meat along the structures similar to a fiber bundle of the muscle-like tissue of the soybean meat.

The soybean meat is preferably colored red using a colorant.

Examples of the colorant include the same colorants as those listed in procedure (1-1).

In addition, it is preferable that a binder is added to the soybean meat, and a seasoning may be added, if necessary.

The soybean meat is gathered into a lump and molded into a shape similar to the shape of a chunk of meat, whereby the lean meat-like portion of the raw meat-like meat alternative is produced.

From the viewpoint of obtaining a raw meat-like meat alternative having a food texture closer to a chunk of meat, it is preferable that, when the soybean meat is gathered into a lump, directions of the structures similar to a bundle of fibers of the muscle-like tissues of the soybean meat are arranged in nearly the same direction.

—Procedure (1-3)—

It is preferable to produce the lean meat-like portion in the same manner as in procedure (1-1) except that a raw material of the lean meat-like portion prior to the extrusion molding in which a colorant has been added thereto is used and extruded instead of adding a colorant to the raw material of the lean meat-like portion after the extrusion molding.

—Procedure (1-4)—

It is preferable to produce the lean meat-like portion in the same manner as in procedure (1-2) except that a soybean meat previously colored red is used instead of coloring a commercially available soybean meat with a colorant.

The method of forming a groove having a depth of 100 μm or more on the surface of the lean meat-like portion is not particularly limited, and examples thereof include a method of pressing the lean meat-like portion with a mold, and a method of cutting the surface of the lean meat-like portion with a knife or the like after the molding.

It is preferable that the groove formed on the surface of the lean meat-like portion is formed such that the area of the fat-like portion on the surface is 3% or more with respect to the entire surface area, and such that a portion having a minor axis of the fat-like portion on the surface of 1 mm or more and having a major axis of the fat-like portion on the surface of 3.0 or more times the minor axis is included.

From the viewpoint of obtaining a raw meat-like meat alternative having an appearance similar to a chunk of meat, as a method for forming a groove having a depth of 100 μm or more on the surface of the lean meat-like portion, it is preferable to form a groove using a mold.

When the groove is formed using a mold, it is preferable to form the groove with a mold while molding the lean meat-like portion.

Figure 6:
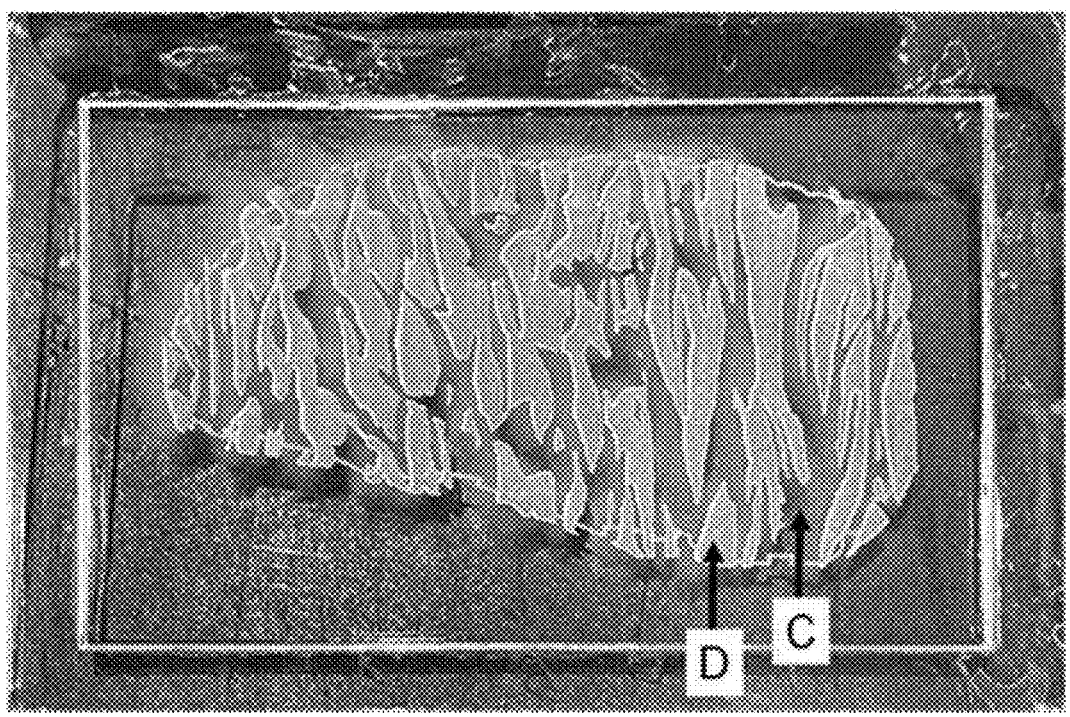
FIG. 6 is a schematic front view showing an example of a mold.
Figure 7:
FIG. 7 is a schematic front view showing another example of a raw meat-like meat alternative having a lean meat-like portion and a fat-like portion.
Figure 8:
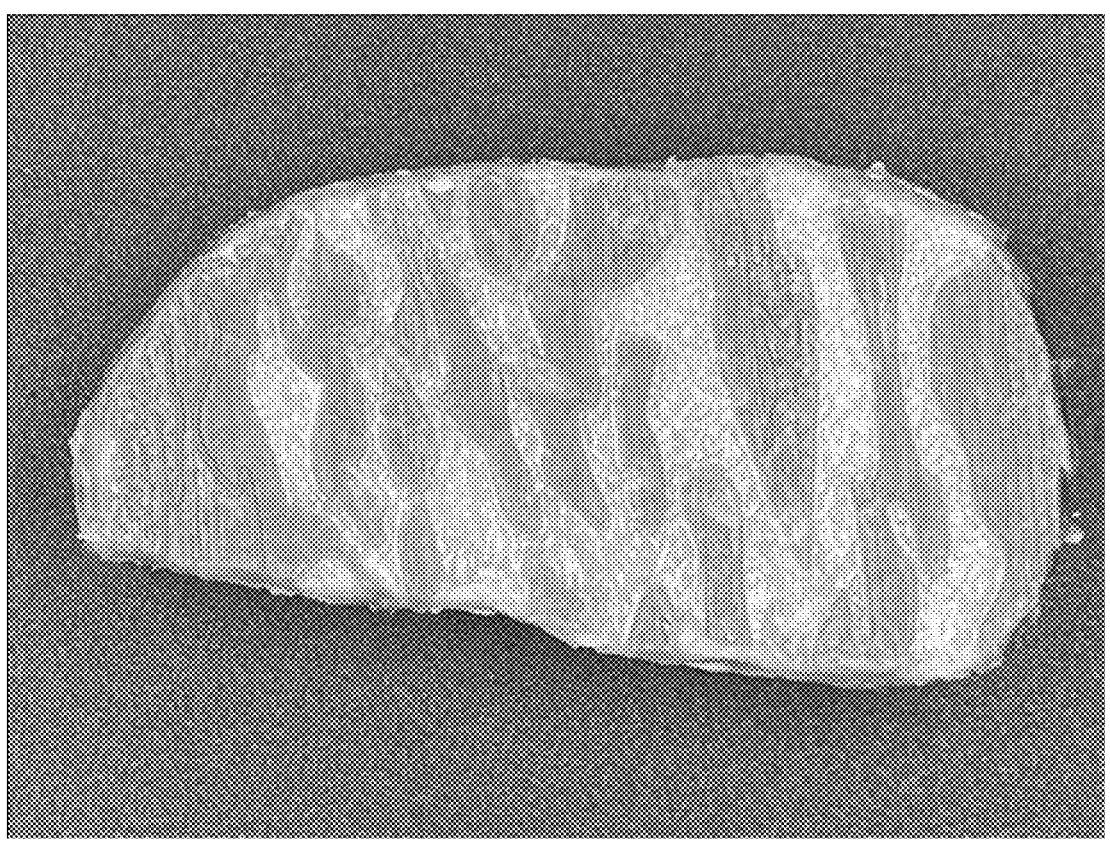
FIG. 8 is a schematic front view showing another example of a raw meat-like meat alternative having a lean meat-like portion and a fat-like portion.
Figure 9:
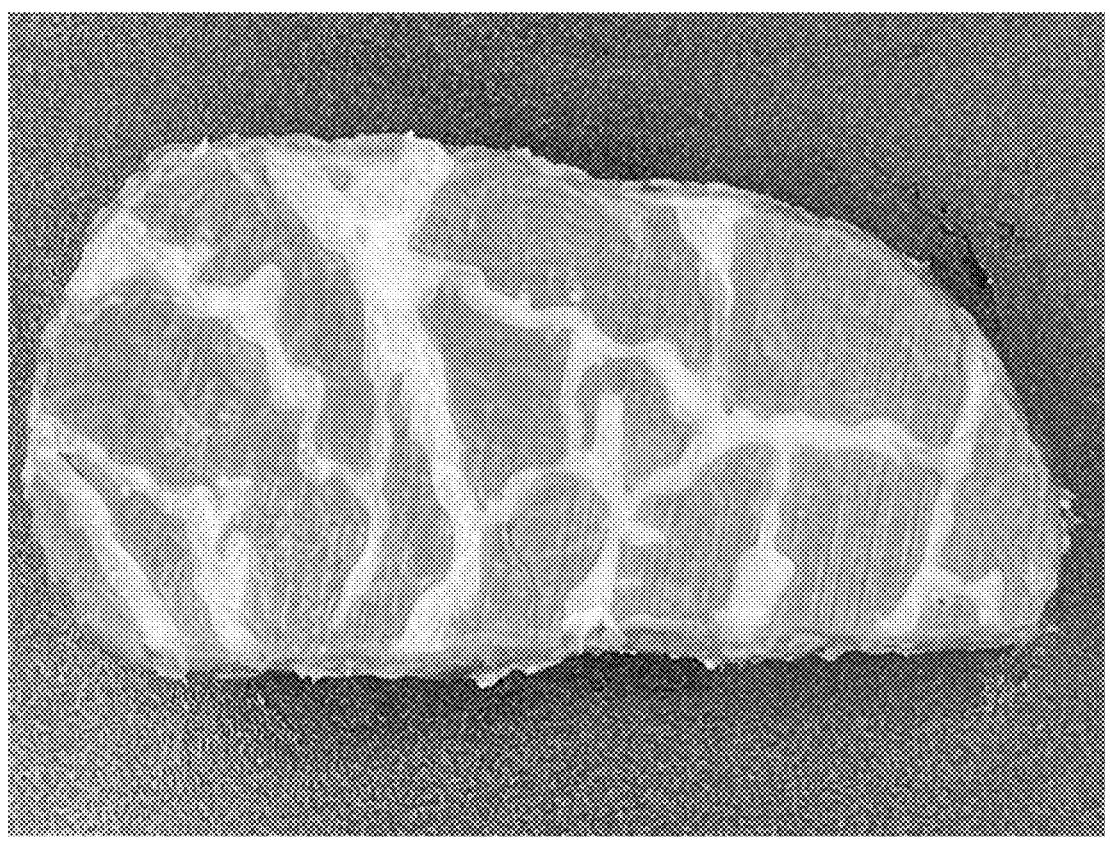
FIG. 9 is a schematic front view showing another example of a raw meat-like meat alternative having a lean meat-like portion and a fat-like portion.
Figure 10:
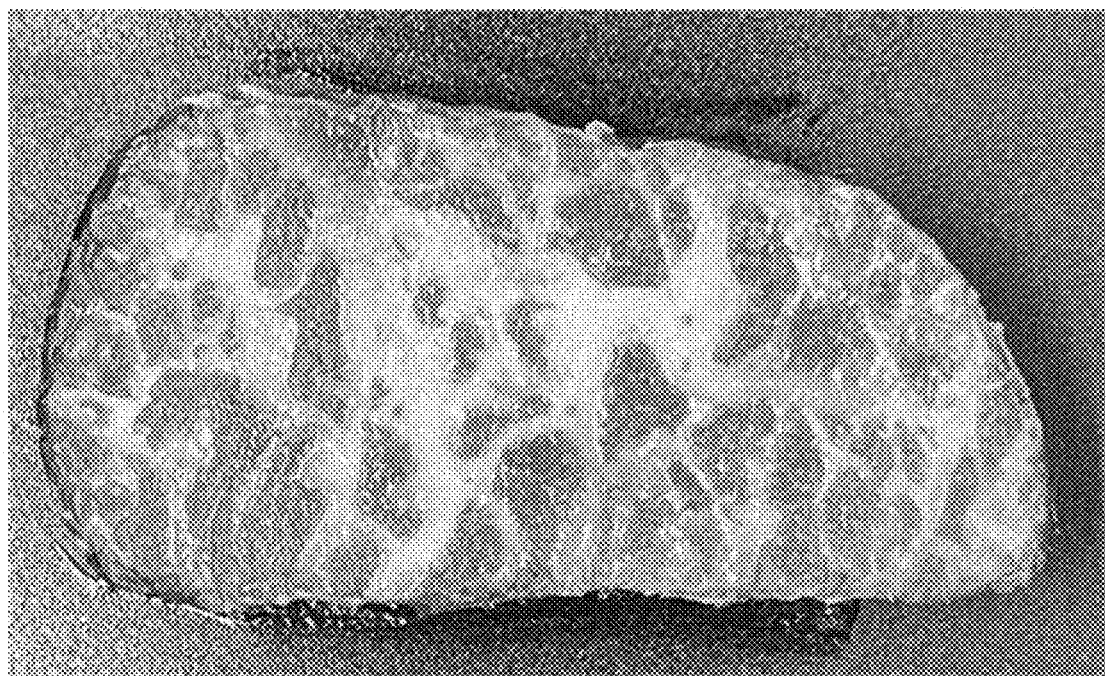
FIG. 10 is a schematic front view showing another example of a raw meat-like meat alternative having a lean meat-like portion and a fat-like portion.
Figure 11:
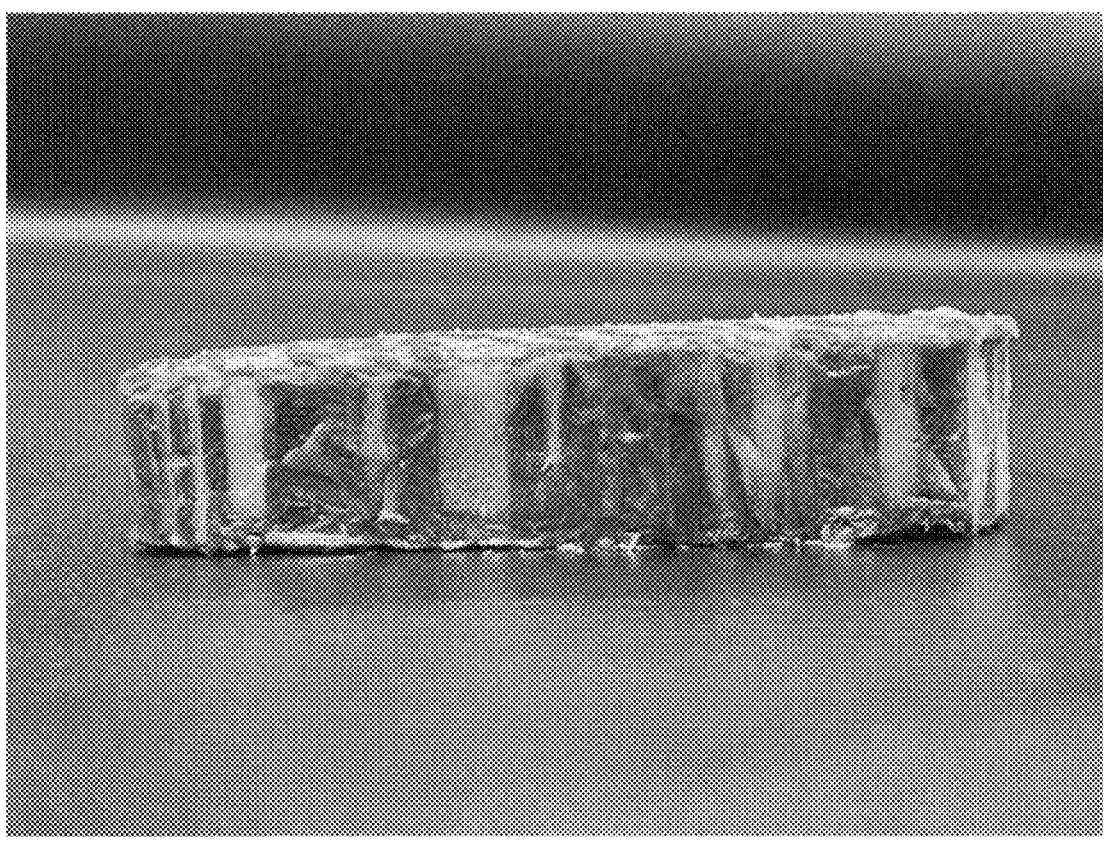
FIG. 11 is a schematic side view showing another example of a raw meat-like meat alternative having a lean meat-like portion and a fat-like portion.
Figure 12:
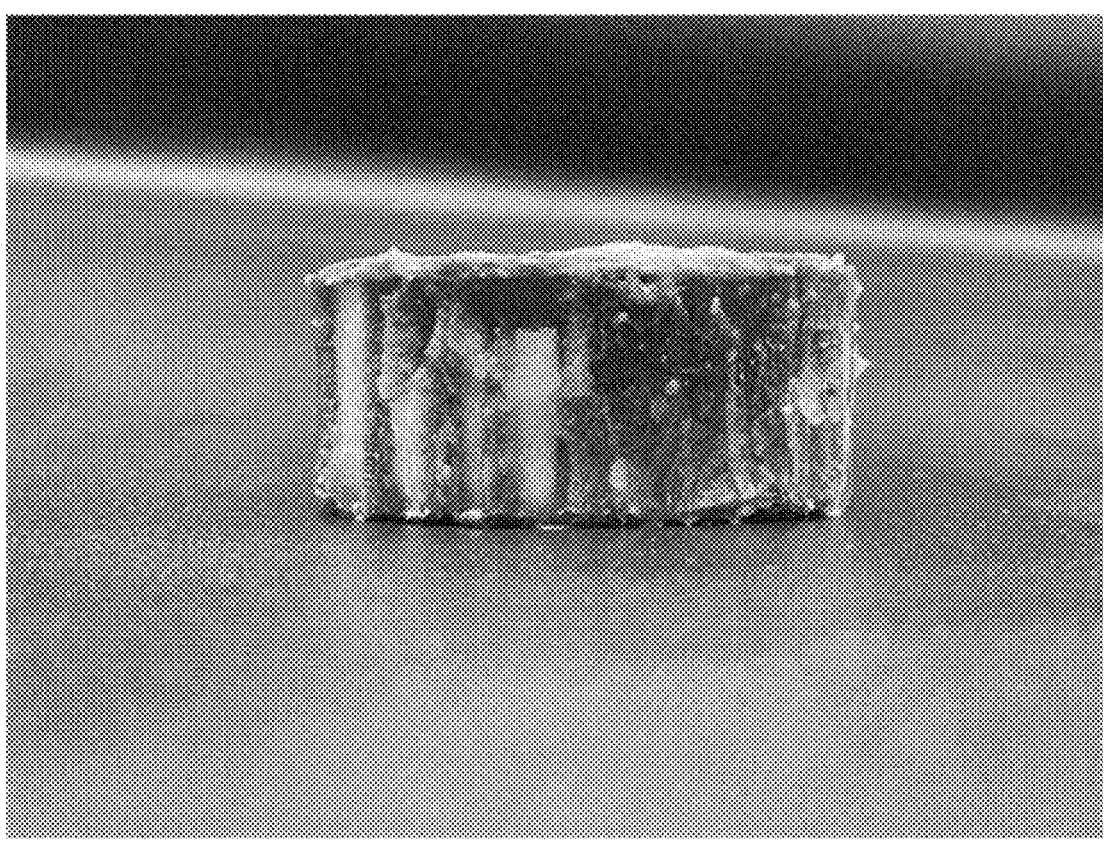
FIG. 12 is a schematic side view showing another example of a raw meat-like meat alternative having a lean meat-like portion and a fat-like portion.
Figure 13:
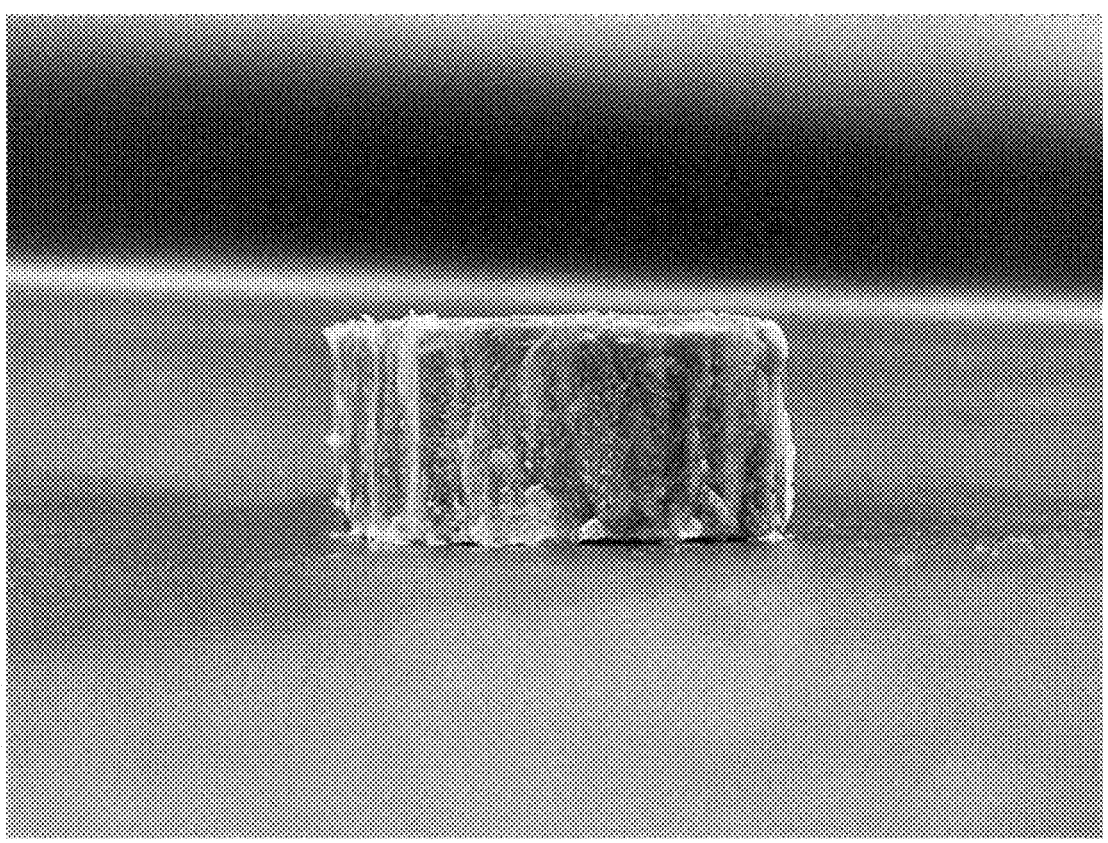
FIG. 13 is a schematic side view showing another example of a raw meat-like meat alternative having a lean meat-like portion and a fat-like portion.
Figure 14:
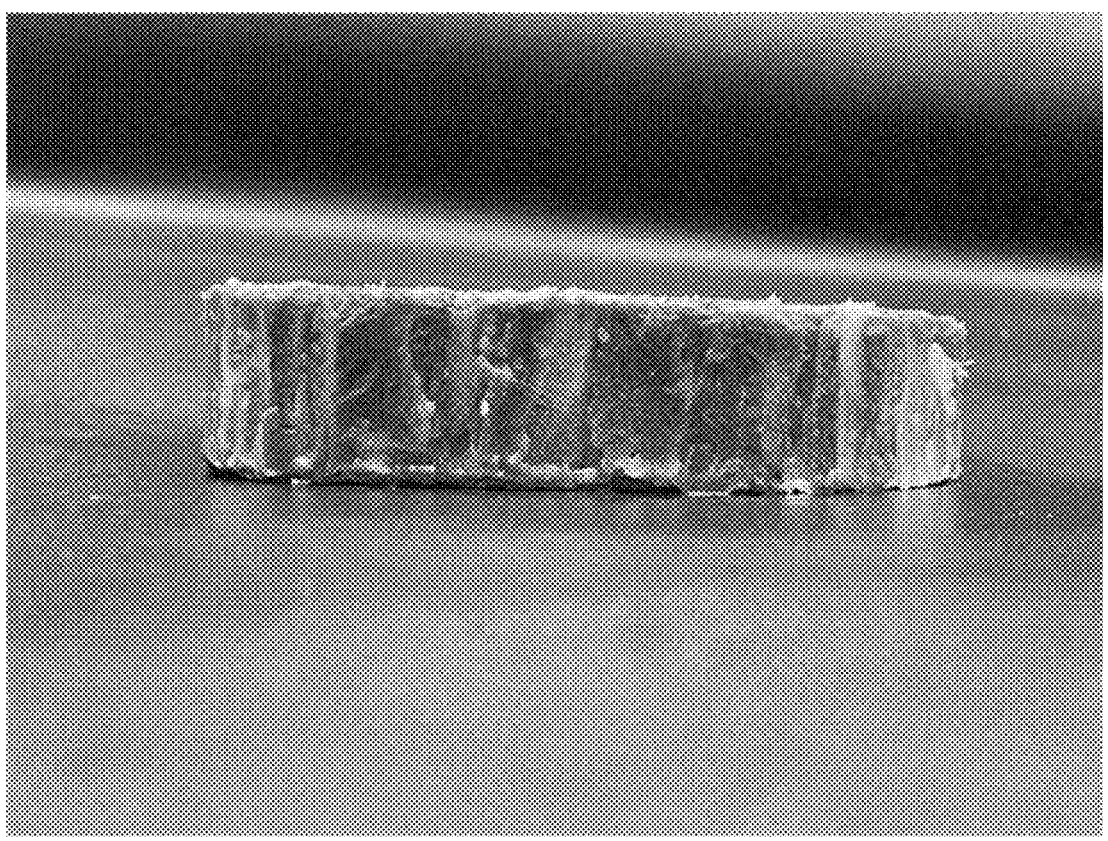
FIG. 14 is a schematic side view showing another example of a raw meat-like meat alternative having a lean meat-like portion and a fat-like portion.

When the method of pressing the lean meat-like portion with a mold is adopted as the method for forming a groove having a depth of 100 μm or more on the surface of the lean meat-like portion, for example, the mold illustrated in FIG. 6 can be used as the mold.

The mold shown in FIG. 6 is a mold having a protrusion provided to obtain a groove having a shape close to the shape of fatty meat of a chunk of meat. Region C in FIG. 6 is a protruding portion, and a groove is formed by bringing the raw material of the lean meat-like portion into contact with C.

On the other hand, region D in FIG. 6 (the whitish region in FIG. 6) is a portion having no protrusion.

<Method for Producing Raw Meat-Like Meat Alternative>

Hereinafter, another embodiment of a method for producing a raw meat-like meat alternative will be described.

The method for producing a raw meat-like meat alternative according to the present disclosure preferably includes: a first step of mixing a fibrous bundle-like organized protein and a binder to obtain a mixture; and a second step of stretching the mixture to obtain a post-stretching mixture in which the fiber axis direction of the fibrous bundle-like organized protein is oriented in one direction.

Hereinafter, said another embodiment of the method for producing a raw meat-like meat alternative according to the present disclosure will be described; however, the method is not limited thereto.

(Preparation Step)

The method for producing a raw meat-like meat alternative according to the present disclosure may include a step of preparing a fibrous bundle-like organized protein before the first step.

As the fibrous bundle-like organized protein, a produced fibrous bundle-like organized protein may be used, or a commercially available fibrous bundle-like organized protein may be used.

When the fibrous bundle-like organized protein is produced, it is preferable that fibrous bundle-like organized protein is produced by extruding a raw material containing a vegetable protein from an extruder.

The extrusion conditions are preferably as follows.

Raw Material Containing Vegetable Protein

The raw material containing a vegetable protein contains at least a vegetable protein, and preferably further contains water from the viewpoint of improving the extrusion efficiency.

The amount of water is preferably from 2 parts by mass to 30 parts by mass with respect to 10 parts by mass of the protein.

Extrusion Conditions

The extruder is not particularly limited, and a known single screw extruder, a non-meshing counter-rotating twin screw extruder, a meshing counter-rotating twin screw extruder, or a meshing co-rotating twin screw extruder can be used.

As for the barrel temperature of the extruder, the temperature of the barrel front half portion (the portion from the site from which the raw material is supplied to the center of the barrel) is preferably from 60° C. to 100° C., the temperature of the barrel center (the center of the length of the barrel in the axial direction) is preferably from 90° C. to 170° C., and the temperature of the barrel rear half portion (the portion from the center of the barrel to the tip of the barrel) is preferably from 140° C. to 180° C.

The extruder preferably has a die attached to the tip of the barrel.

The die is preferably a die with which a sheet-like extrudate is obtained.

The gap (lip clearance) of the discharge port of the die is preferably from 1 mm to 10 mm.

The length of the die is preferably 30 mm or more.

The die may be a cooling die. Here, the cooling die refers to a die to be cooled by, for example, circulation of a cooling liquid (water, glycol, or the like).

By using a cooling die, the swelling of the extruded raw material is easily suppressed. Therefore, the organized protein extruded using a cooling die tends to be fibrous.

When the cooling die is used, the temperature of the discharge port of the cooling die is preferably from 90° C. to 120° C.

When a commercially available organized protein is used, as the fibrous bundle-like organized protein, "What the cluck" manufactured by The Vegetarian Butcher, APEX1000 manufactured by FUJI OIL CO., LTD., or the like can be used.

(First Step)

The first step is a step of mixing a fibrous bundle-like organized protein and a binder to obtain a mixture.

The fibrous bundle-like organized protein has the same meaning as the fibrous bundle-like organized protein contained in the raw meat-like meat alternative, and the preferred embodiments are also the same as those of the fibrous bundle-like organized protein contained in the raw meat-like meat alternative.

As the binder, the same binder as the binder contained in the raw meat-like meat alternative can be used.

From the viewpoint of moldability, heat resistance, and food texture, the binder preferably contains a thermally reversible gel-forming polysaccharide and a thermally irreversible gel-forming polysaccharide.

The content of the thermally reversible gel-forming polysaccharide is preferably from 10% by mass to 90% by mass, more preferably from 20% by mass to 80% by mass, and still more preferably from 30% by mass to 70% by mass, with respect to the entire binder.

The content of the thermally irreversible gel-forming polysaccharide is preferably from 10% by mass to 90% by mass, more preferably from 20% by mass to 80% by mass, and still more preferably from 30% by mass to 70% by mass, with respect to the entire binder.

In the first step, the addition amount of the binder is preferably from 1% by mass to 30% by mass, more preferably from 3% by mass to 25% by mass, and still more preferably from 5% by mass to 20% by mass, with respect to the mass of the fibrous bundle-like organized protein swollen with moisture.

The method for mixing the fibrous bundle-like organized protein and the binder is not particularly limited, and examples thereof include a method of mixing the foregoing by hand, a method of using a known mixing machine, and the like.

Examples of the mixing machine include a mixer, and it is preferable that the attachment has a structure that enables the material adhered to the surface of the wall to be scraped up.

It is preferable to adjust the fibrous bundle-like organized protein to an appropriate size before mixing the fibrous bundle-like organized protein with the binder.

Examples of the method for adjusting the size of the fibrous bundle-like organized protein include a method of tearing the fibrous bundle-like organized protein, a method of cutting the fibrous bundle-like organized protein with a knife, and a method using both of the foregoing.

For adjusting the size of the fibrous bundle-like organized protein, the protein may be crushed in the vicinity of the discharge port of the extruder, or may be crushed by using a meat-loosening machine after being recovered from the extruder, in the above-described (preparation step).

The fibrous bundle-like organized protein preferably has a dimension of a width of from 2 mm to 35 mm and a length of from 35 mm to 500 mm before being mixed with the binder.

The thickness of the fibrous bundle-like organized protein is not particularly limited, and is preferably appropriately adjusted according to the thickness of the fibrous bundle-like organized protein produced using an extruder or the like. The length of the fibrous bundle-like organized protein is preferably, for example, from 0.1 to 2 times the length of the raw meat-like meat alternative to be produced.

Here, when the raw meat-like meat alternative to be produced contains an oil and/or fat, a fat mass composition, other additives, or the like, it is preferable to mix them with the fibrous bundle-like organized protein and the binder in the first step.

(Second Step)

The second step is a step of stretching the mixture to obtain a post-stretching mixture in which the fiber axis direction of the fibrous bundle-like organized protein is oriented in one direction.

The method for stretching the mixture obtained in the first step (hereinafter, also referred to as "first step mixture") is not particularly limited as long as a post-stretching mixture in which the fiber axis direction of the fibrous bundle-like organized protein is oriented in one direction is obtained.

Here, the fiber axis direction of the fibrous bundle-like organized protein means the direction in the longitudinal direction of the fibers forming the muscle-like tissue.

The phrase "the fiber axis direction of the fibrous bundle-like organized protein is oriented in one direction" encompasses a case in which the fiber axis directions of the fibrous bundle-like organized proteins are completely the same and a case in which the fiber axis directions of the fibrous bundle-like organized proteins are different from one another but are oriented in a certain direction.

The second step is preferably a step of stretching the mixture obtained by the first step to obtain a post-stretching mixture in which the integrated orientation degree of the fiber direction of the fibrous bundle-like organized protein in a cross section along the stretching direction (hereinafter, also simply referred to as "specific integrated orientation degree") is 1.1 or more, or in which the standard deviation of orientation angle (hereinafter, also simply referred to as "specific standard deviation of orientation angle") is 20 or less.

From the viewpoint of the appearance, cross section, and food texture, the specific integrated orientation degree is preferably 1.1 or more, more preferably 1.15 or more, and still more preferably 1.2 or more. The specific standard deviation of orientation angle is preferably 20 or less, more preferably 15 or less, and still more preferably 10 or less.

The specific integrated orientation degree and the specific standard deviation of orientation angle are values calculated by the method described in Non-Patent Document 1 described above.

Specifically, the values are calculated by the method described in Non-Patent Document 1 described above from an image obtained by photographing a cross section in the stretching direction of the post-stretching mixture.

(Method of Measuring Specific Integrated Orientation Degree and Specific Standard Deviation of Orientation Angle)

Specifically, the specific integrated orientation degree and the specific standard deviation of orientation angle are calculated as follows.

(Cross-Sectional Imaging)

The post-stretching mixture after the second step is heated and hardened. Thereafter, the post-stretching mixture is cut along the stretching direction to expose a cross section, and the cross section of the post-stretching mixture is photographed under the same photographing conditions as those in (method of measuring the integrated orientation degree and the standard deviation of orientation angle of the fiber direction in the cross section of the raw meat-like meat alternative) described above. The photographing is performed 25 times while the photographing positions are changed to obtain a total of 25 cross-sectional images of the post-stretching mixture. From each of the 25 cross-sectional images obtained by the photographing, one portion corresponding to a region of a square having a side of 25 mm is cut out as a unit area from the cross section of the post-stretching mixture, and is converted into 512×512 pixels. One unit area is cut out per cross-sectional image to obtain a total of 25 unit areas.

From the 25 unit areas obtained by the above procedure, the specific integrated orientation degree is calculated in the same manner as in "—Calculation of integrated orientation degree" described above, and the specific standard deviation of orientation angle is calculated in the same manner as in "—Calculation of standard deviation of orientation angle" described above.

Here, in a case in which the size of the post-stretching mixture is less than 25 mm, the same post-stretching mixtures are aligned such that the orientation of the fiber direction is in the same direction, so that the post-stretching mixture has a size of 25 mm or more, and the photographing and calculation of the integrated orientation degree and the standard deviation of orientation angle are performed.

From the viewpoint of the specific integrated orientation degree and the specific standard deviation of orientation angle, the method for stretching the first step mixture is preferably any of the following:

(i) a method of allowing the first step mixture to pass through an area surrounded by a set or rollers in the direction perpendicular to a plane containing the rotation axes of the set of rollers so as to press the first step mixture by the rollers, thereby stretching the first step mixture in the direction perpendicular to the plane containing the rotation axes of the set of rollers;

(ii) a method of placing the first step mixture within a set of rollers that have rotation axes parallel to one another and that rotate in the same direction, and reducing the distance of the rollers between one another while rotating the first step mixture so as to press the first step mixture, thereby stretching the first step mixture in the direction parallel to the rotation axes of the rollers;

(iii) a method of allowing the first step mixture to pass through an area that is surrounded by a roller and a guide located along a part of the outer periphery of the roller, and in which the width between the roller and the guide is narrowed along the rotation direction of the roller, while rotating the first step mixture, so as to press and stretch the first step mixture;

(iv) a method of gripping the surface of the first step mixture and pulling the first step mixture, thereby stretching the first step mixture; and (v) a method of pressing the first step mixture with a plate, thereby stretching the first step mixture.

The stretch ratio of the mixture is preferably 2 times or more, more preferably 4 times or more, and still more preferably 6 times or more.

The stretch ratio is a value obtained by dividing the length of the post-stretching mixture in the stretching direction by the length of the first step mixture in the stretching direction.

The stretching direction refers to a direction along which the first mixture is stretched in the second step.

—(i)—

Here, details of the method of allowing the mixture to pass through an area surrounded by a set or rollers (hereinafter, also referred to as "a roller set") in the direction perpendicular to a plane containing the rotation axes of the set of rollers so as to press the mixture by the rollers, thereby stretching the mixture in the direction perpendicular to the plane containing the rotation axes of the set of rollers, will be described.

Here, the term "perpendicular" encompasses a scope that can be deemed as a substantially right angle (specifically, a range of 90°±10°).

Examples of the method of allowing the first step mixture to pass through an area surrounded by a set of rollers in the direction perpendicular to a plane containing the rotation axes of the set of rollers include a method of allowing the first step mixture to pass through the area surrounded by the set of rollers by moving at least one of the roller set or the first step mixture.

From the viewpoint of simplifying the process of continued production, transferring the first step mixture is preferable.

The method of transferring the first step mixture is not particularly limited, and the first step mixture may be transferred by being wrapped with a film, which is pulled as a carrier.

Figure 16:
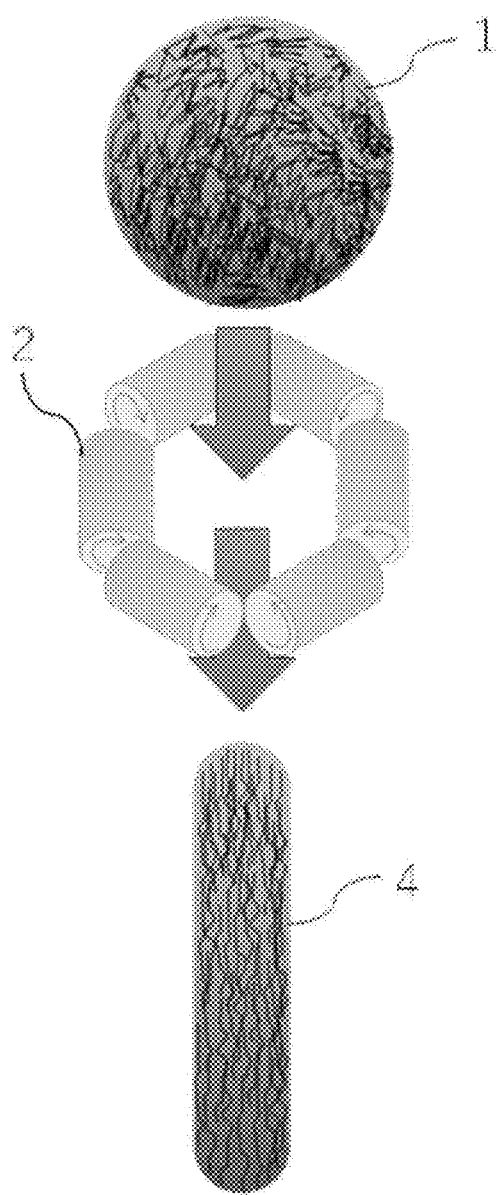
FIG. 16 is a schematic perspective view showing an example of an arrangement mode of a set of rollers.

FIG. 16 illustrates an example of an arrangement mode of the roller set.

FIG. 16 is a view showing a series of flows of allowing a first step mixture 1 to pass through an area surrounded by a set of rollers (roller set) 2, thereby stretching the first step mixture 1 to obtain a post-stretching mixture 4.

The first step mixture 1 passes through the area surrounded by the set of rollers 2 along the direction perpendicular to a plane containing the rotation axes of the rollers included in the set of rollers 2 (that is, the direction of the thick arrow in FIG. 16).

By this process, the first step mixture 1 is pressed by the rollers, and thereby the first step mixture 1 is stretched in the direction perpendicular to the rotation axes of the rollers.

The rollers included in the set of rollers 2 will be described below.

The size of the rollers is not particularly limited, and is adjusted as appropriate according to the size of the raw meat-like meat alternative to be produced.

The length of the rollers in the axial direction is preferably, for example, from 10 mm to 200 mm.

The diameter of the rollers (the diameter of a cross section of the roller in a plane orthogonal to the axial direction of the roller) is preferably, for example, from 10 mm to 100 mm.

The rollers included in the set of rollers may have the same size or different sizes.

In the roller set, two rollers may be arranged such that the rotation axes of the rollers are parallel, or three or more rollers may be arranged such that the rotation axes of the rollers form polygonal sides.

In the case of two rollers, the distance between the rollers (obtained by subtracting the radius of the two rollers from the distance between the axes of the rollers) is, for example, preferably from 5 mm to 200 mm, more preferably from 10 mm to 150 mm, and still more preferably from 20 mm to 100 mm.

In the case of three or more rollers, the area of the region surrounded by the rollers (that is, the area surrounded by the rollers in the plane containing the rotation axes of the rollers) is, for example, preferably from 25 $mm^2$ to 90000 $mm^2$, more preferably from 100 $mm^2$ to 62500 $mm^2$, and still more preferably from 400 $mm^2$ to 40000 $mm^2$.

The roller may rotate by itself in the circumferential direction of the roller, or the roller may rotate in the circumferential direction by the stress generated by the first step mixture passing between the rollers.

As for the rotation direction of the rollers, it is preferable that the portion of the roller to be in contact with the first step mixture is rotated along the direction along which the first step mixture is transferred.

When the roller rotates by itself in the circumferential direction, the number of rotations of the roller is not particularly limited, and is, for example, from 10 rpm to 100 rpm. Here, rpm is an abbreviation for revolutions per minute.

From the viewpoint of continued production and from the viewpoint of orientation angle, the second step is preferably a step of allowing the first step mixture to pass through plural sets of rollers disposed along one direction to stretch the first step mixture.

Figure 17:
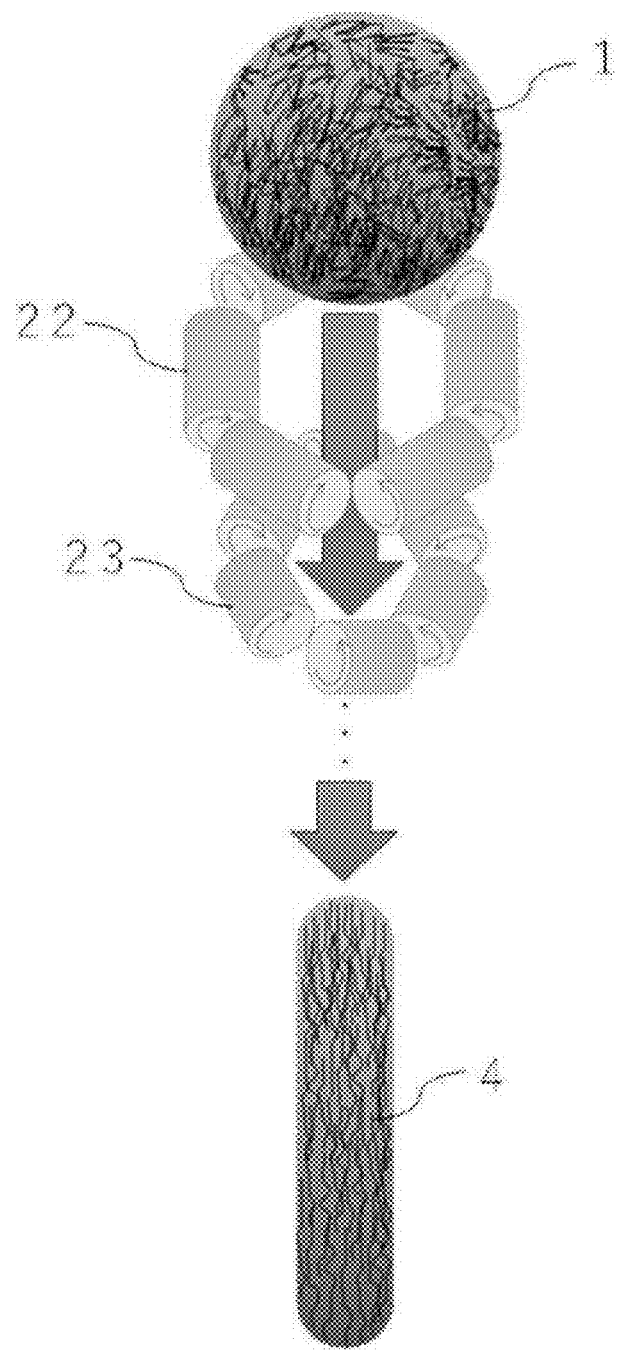
FIG. 17 is a schematic perspective view showing another example of an arrangement mode of a set of rollers.

FIG. 17 illustrates an example of the multi-step arrangement mode of the plural roller sets.

FIG. 17 is a view showing a series of flows of allowing the first step mixture 1 to pass through a first roller set 22 and a second roller set 23 to stretch the first step mixture 1 to obtain the post-stretching mixture 4.

In FIG. 17, the first roller set 22 and the second roller set 23 are arranged along the direction along which the first step mixture 1 is transferred.

In addition, it is preferable that, when the direction along which the first step mixture 1 is transferred is defined as the axis, the first roller set 22 and the second roller set 23 are arranged so as to have an intersection angle with each other in the direction circling around the foregoing axis.

The number of the roller sets may be two or more, and is preferably adjusted according to the size of the first step mixture and the size of the raw meat-like meat alternative to be produced.

The number of roller sets is preferably from 2 to 6, more preferably from 2 to 5, and still more preferably from 2 to 4.

The distance between the roller sets is, for example, preferably from 10 mm to 200 mm, more preferably from 20 mm to 150 mm, and still more preferably from 30 mm to 100 mm.

The distance between the roller sets refers to the perpendicular distance between a plane including the rotation axes of the rollers included in one roller set and a plane including the rotation axes of the rollers included in another roller set.

The intersection angle between the roller sets is preferably adjusted as appropriate according to the number of the roller sets.

For example, when there are two roller sets, the intersection angle is preferably from 80 degrees to 90 degrees, preferably from 85 degrees to 90 degrees, and more preferably 90 degrees.

When there are three or more roller sets, the intersection angles between adjacent roller sets may be the same or different.

The intersection angle between adjacent roller sets is preferably from 10 degrees to 90 degrees, preferably from 15 degrees to 80 degrees, and more preferably from 20 degrees to 70 degrees.

Here, the intersection angle between roller sets means the smaller one of the intersection angles formed by the axis of one roller of the rollers included in one roller set and the axis of one roller of the rollers included in the other roller set.

—(ii)—

Next, the method of placing the mixture within a set of rollers that have rotation axes parallel to one another and that rotate in the same direction, and reducing the distance of the rollers between one another while rotating the mixture so as to press the mixture, thereby stretching the mixture in the direction parallel to the rotation axes of the rollers, will be described.

The size of the rollers is not particularly limited, and is adjusted as appropriate according to the size of the raw meat-like meat alternative to be produced.

The length of the roller in the axial direction is preferably, for example, from 10 mm to 2000 mm.

The diameter of the roller (the diameter of a cross section of the roller in a plane orthogonal to the axial direction of the roller) is preferably, for example, from 10 mm to 1000 mm.

The rollers are preferably arranged such that the axes of the rollers are parallel.

The radius of a circle inscribed in all of the rollers included in the set of rollers (the radius of the first step mixture surrounded by the rollers) may be constant or varied during the second step.

Hereinafter, the radius of the circle inscribed in all of the rollers included in one set of rollers is also simply referred to as "specific radius".

In order to stretch the first step mixture, it is preferable to move one or both of the rollers included in one set of rollers to change the specific radius during the second step.

In the case in which the specific radius is changed, for example, the specific radius at the start of the second step is preferably from 1 mm to 200 mm, more preferably from 2 mm to 150 mm, and still more preferably from 5 mm to 100 mm.

In the case in which the specific radius is changed, for example, the specific radius at the end of the second step is preferably from 1 mm to 100 mm, more preferably from 2 mm to 75 mm, and still more preferably from 5 mm to 50 mm.

The number of rotations of the roller is not particularly limited, and is, for example, from 10 rpm to 100 rpm.

From the viewpoint of stably rotating the mixture, the rotation directions of a set of rollers are preferably the same direction.

Aspect of (ii) will be specifically described with reference to FIG. 18.

Figure 18:
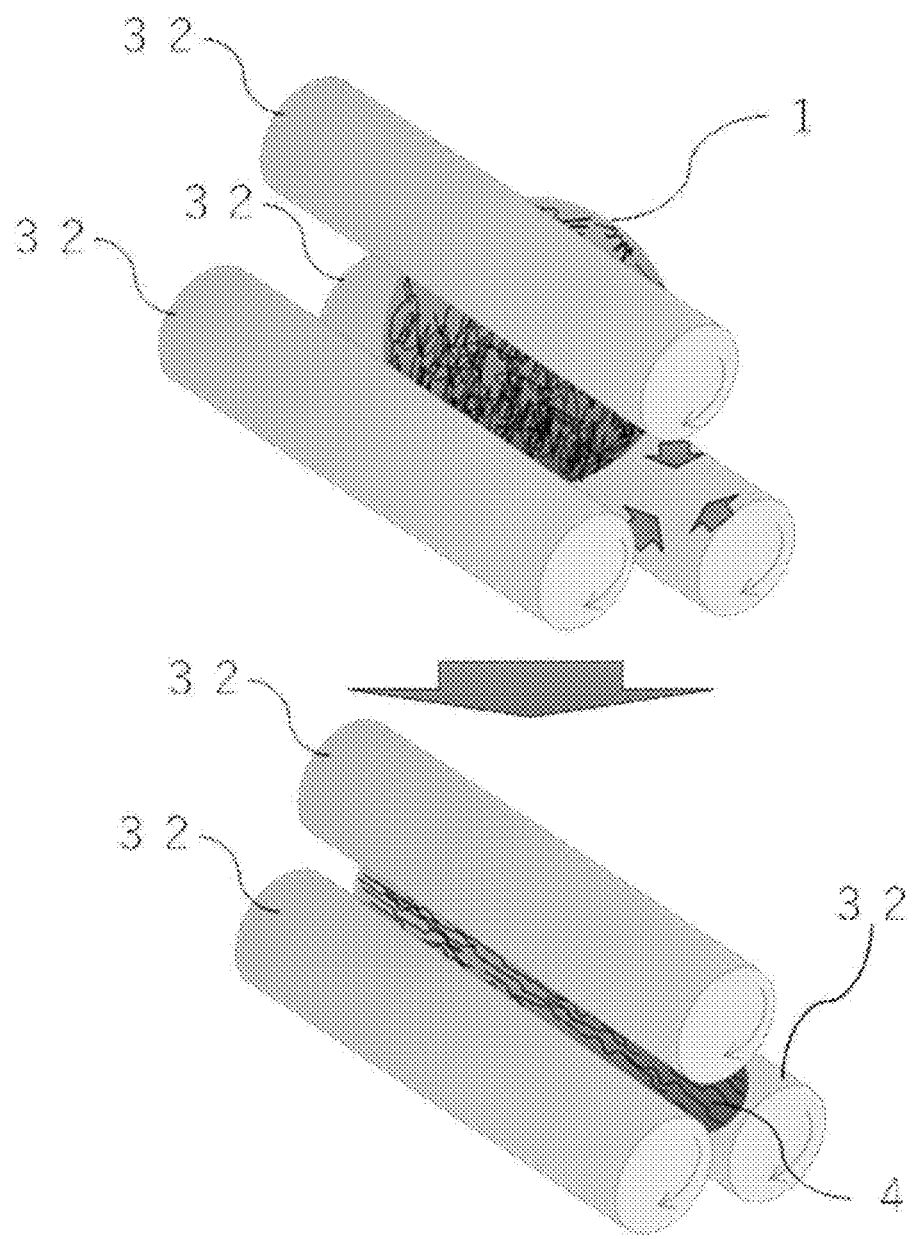
FIG. 18 is a schematic perspective view showing another example of an arrangement mode of a set of rollers.

Note that FIG. 18 illustrates an example of aspect of (ii), and that aspect of (ii) is not limited thereto.

FIG. 18 is a diagram showing a series of flows of rotating a first step mixture 1 on the surface of a rotating set of rollers 32 and thereby stretching the first step mixture 1 to obtain a post-stretching mixture 4.

In (ii), the rollers may have an uneven shape on the surface of the rollers.

In (ii), in order to promote the stretching of the first step mixture, it is preferable that the surface of the rollers has a spiral uneven shape that moves from the center of the rotating rollers in the rotation axis direction to both ends of the rollers in the rotation axis direction. This aspect is shown in FIG. 19.

Figure 19:
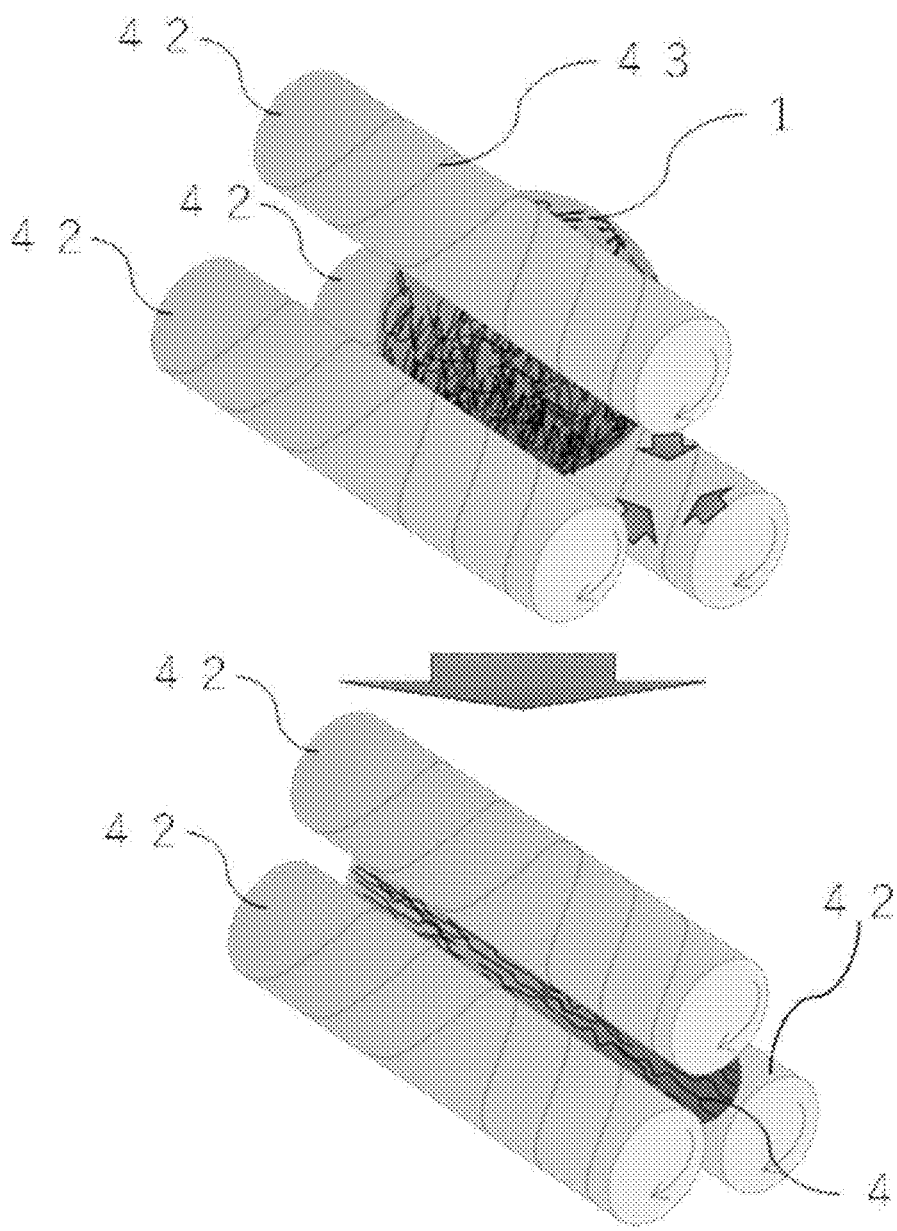
FIG. 19 is a schematic perspective view showing another example of an arrangement mode of a set of rollers.

FIG. 19 is a diagram showing a series of flows of rotating the first step mixture 1 on the surface of the rotating set of rollers 42 and thereby stretching the first step mixture 1 to obtain the post-stretching mixture 4.

Each roller surface included in the set of rollers 42 has a spiral uneven shape 43 that moves from the center of the rotating roller in the rotation axis direction to both ends of the roller in the rotation axis direction.

The spiral uneven shape 43 is preferably an uneven shape extending spirally from the center in the rotation axis direction of the roller as a starting point to both ends of the roller in the rotation axis direction.

—(iii)—

Next, the method of allowing the first step mixture to pass through an area that is surrounded by a roller and a guide located along a part of the outer periphery of the roller, and in which the width between the roller and the guide is narrowed along the rotation direction of the roller, while rotating the first step mixture, so as to press and stretch the first step mixture, will be described.

The size of the roller is not particularly limited, and is adjusted as appropriate according to the size of the raw meat-like meat alternative to be produced.

The length of the roller in the axial direction is preferably, for example, from 10 mm to 2000 mm.

The diameter of the roller (the diameter of a cross section of the roller in a plane orthogonal to the axial direction of the roller) is preferably, for example, from 10 mm to 3000 mm.

The guide is preferably disposed along the outer periphery of the roller.

In the area that is surrounded by a roller and a guide located along a part of the outer periphery of the roller, the width between the roller and the guide may be narrowed along the rotation direction of the roller.

Hereinafter, the radius of a circle that would be in contact with the tip of the guide in the downstream side of the rotation direction of the roller and that would be in contact with the outer periphery of the roller is referred to as "specific radius 2A". Further, the radius of a circle that would be in contact with the tip of the guide in the upstream side of the rotation direction of the roller and that would be in contact with the outer periphery of the roller is referred to as "specific radius 2B".

In order to stretch the first step mixture, it is preferable to change the specific radius 2A and the specific radius 2B during the second step.

When the specific radius 2A is changed, for example, the specific radius 2A at the start of the second step is preferably from 1 mm to 400 mm, more preferably from 2 mm to 300 mm, and still more preferably from 5 mm to 200 mm.

When the specific radius 2B is changed, for example, the specific radius 2B at the end of the second step is preferably from 1 mm to 200 mm, more preferably from 2 mm to 150 mm, and still more preferably from 5 mm to 100 mm.

The number of rotations of the roller is not particularly limited, and is, for example, from 10 rpm to 100 rpm.

Aspect of (iii) will be specifically described with reference to FIG. 20.

Figure 20:
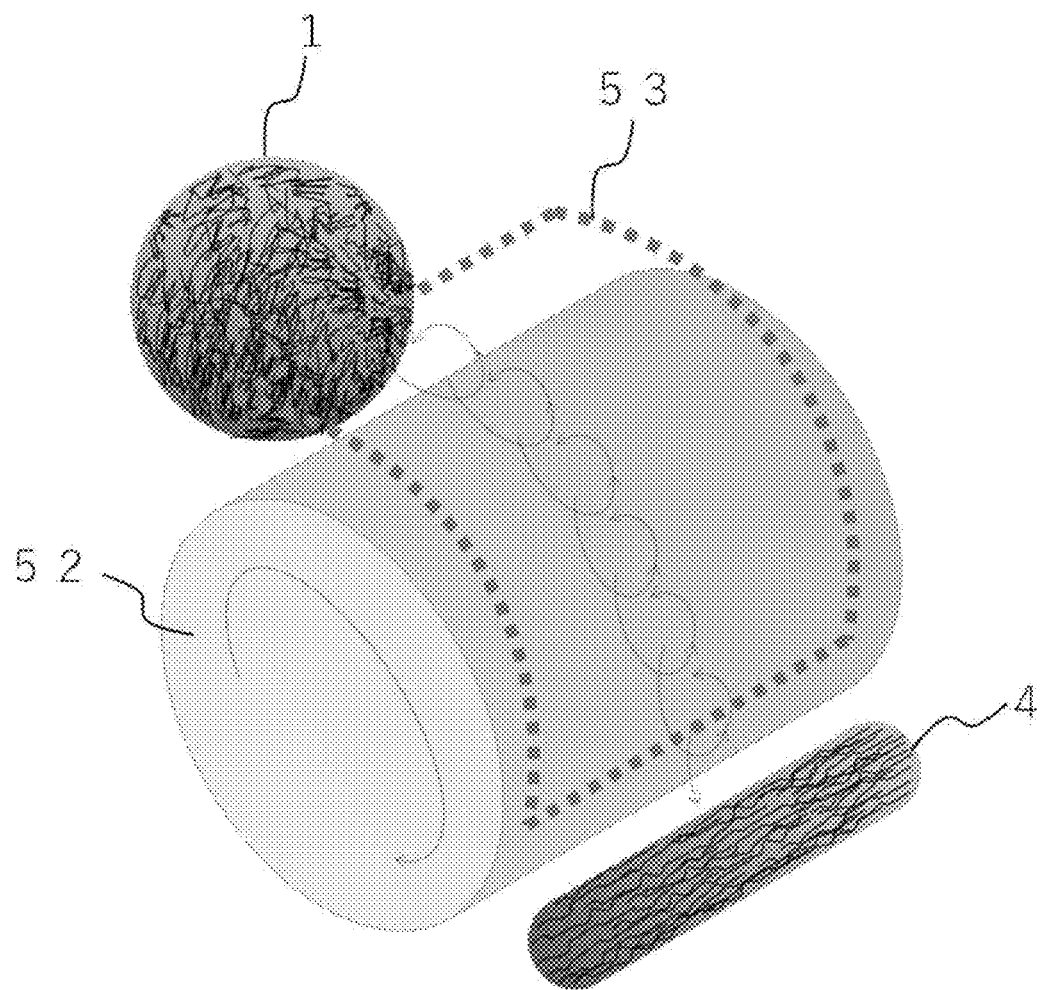
FIG. 20 is a schematic perspective view showing an example of an arrangement mode of a roller and a guide.

Note that FIG. 20 illustrates an example of aspect of (iii), and that aspect of (iii) is not limited thereto.

FIG. 20 is a diagram showing a series of flows for obtaining a post-stretching mixture 4. A first step mixture 1 is allowed to pass, while being rotated, through an area that is surrounded by a rotating roller 52 and a guide 53 located along a part of the outer periphery of the roller, and in which the width between the roller and the guide 53 is narrowed along the rotation direction of the roller 52, to be pressed. By this, the first step mixture 1 is stretched, whereby a post-stretching mixture 4 is obtained.

In (iii), the roller may have an uneven shape on the surface of the roller.

In (iii), in order to promote the stretching of the first step mixture, it is preferable that the surface of the rollers has a spiral uneven shape that moves from the center of the rotating rollers in the rotation axis direction to both ends of the rollers in the rotation axis direction.

—(iv)—

Subsequently, details of the method of gripping the surface of the first step mixture and pulling the first step mixture, thereby stretching the first step mixture, will be described.

The method for gripping the surface of the first step mixture and pulling the first step mixture is not particularly limited.

Examples of the method for gripping the surface of the first step mixture and pulling the first step mixture include a method of gripping the surface of the first step mixture and pulling the first step mixture by hand.

In the case of gripping the surface of the first step mixture and pulling the first step mixture by hand, for example, it is preferable that the surface of the first step mixture is gripped with the right hand and the left hand, and that the first step mixture is pulled such that the shape of the first step mixture becomes a rod shape.

—(v)—

Subsequently, details of the method of pressing the first step mixture with a plate, thereby stretching the first step mixture, will be described.

The method of (v) is not particularly limited.

As the method of (v), for example, a method of placing a first step mixture into a mold and pressing the mixture with a plate to stretch the mixture along the shape of the mold may be used, or a method of sandwiching the first step mixture between two plates and pressing the first step mixture while rotating the first step mixture by moving the plates to stretch the mixture may be used.

The shape of the mold is not particularly limited, and from the viewpoint of the orientation angle, it is preferable to form a shape in which the stretch ratio of the post-stretching mixture obtained after the pressing with a plate is high.

The details of the methods (i) to (v) of stretching the first step mixture are as described above.

The second step preferably includes, after stretching the first step mixture, operations of cutting the post-stretching mixture, stacking the cut post-stretching mixtures such that the longitudinal directions of the post-stretching mixtures are aligned with one another, and stretching the first step mixture again.

When the series of operations including, after stretching the first step mixture, cutting the post-stretching mixture, stacking the cut post-stretching mixtures such that the longitudinal directions of the post-stretching mixtures are aligned with one another, and stretching the first step mixture again, is defined as one cycle, the number of cycles is preferably from 1 to 5, and more preferably from 2 to 4, from the viewpoint of the orientation angle and productivity.

The method for cutting the post-stretching mixture is not particularly limited, and examples thereof include a method of cutting by hand, and a method of cutting by using a cutter or the like.

In the case of stacking the cut post-stretching mixtures such that the longitudinal directions of the post-stretching mixtures are aligned with one another, and stretching the first step mixture again, the method of stretching the first step mixture may be the same or different in each cycle.

Here, in a case in which the raw meat-like meat alternative to be produced contains an oil and/or fat, a fat mass composition, other additives, and the like, these may be mixed at the time of stacking the post-stretching mixtures between the cycles.

(Third Step)

The method for producing a raw meat-like meat alternative according to the present disclosure preferably includes, after the second step, a third step of molding the post-stretching mixture to obtain a molded body, and then heating and hardening the molded body.

In a case in which the binder contains a thermally irreversible gel-forming polysaccharide, the formation of a gel containing the thermally irreversible gel-forming polysaccharide is promoted by heating the molded body. As a result, the molded body is hardened, and the shape of the raw meat-like meat alternative is more easily maintained.

The shape of the molded body is preferably a shape similar to, for example, steak meat or meat for stewing.

The method for molding the post-stretching mixture is not particularly limited, and examples thereof include a method of cutting the post-stretching mixture and a method of deforming the post-stretching mixture by applying an external force. From the viewpoint of food texture, a method of cutting the post-stretching mixture is preferable.

When the post-stretching mixture is cut, it is preferable to cut the post-stretching mixture in a direction orthogonal to the fiber axis direction of the organized protein contained in the post-stretching mixture.

When the post-stretching mixture is cut, it is preferable to cut the mixture using a knife such as a cutter or a kitchen knife.

The third step preferably includes, when the post-stretching mixture is molded to obtain a molded body, a step of cutting the post-stretching mixture perpendicularly to the orientation direction of the fibers, and a step of bundling plural pre-cutting or post-cutting post-stretching mixtures.

Plural cut post-stretching mixtures may be bundled and molded with the fiber directions aligned with one another, or plural post-stretching mixtures or cut post-stretching mixtures may be bundled with the fiber directions aligned with one another, and then cut perpendicularly to the fiber direction and molded.

By molding the post-stretching mixture such that the fiber direction is along the film thickness direction of the steak, a raw meat-like meat alternative having an appearance similar to that of steak meat of livestock meat tends to be easily obtained.

The third step may include a step of forming a pattern similar to fatty meat (marble pattern) on the surface of the molded body (hereinafter, also referred to as "step of forming a fat-like portion") after molding the post-stretching mixture to obtain the molded body, for the purpose of bringing the appearance of the raw meat-like meat alternative closer to the appearance of livestock meat.

The step of forming a fat-like portion is preferably a step of forming a groove having a depth of, for example, 100 μm or more on the surface of the molded body and forming a fat-like portion by depositing an oil and/or fat in the formed groove.

Examples of the method for forming a groove on the surface of the molded body include a method of engraving the surface with a knife and a method of forming a groove with a mold, and a method of forming a groove with a mold is preferable.

When the method of forming a groove with a mold is adopted as the method for forming a groove on the surface of the molded body, for example, a mold illustrated in FIG. 6 can be used as the mold.

By pressing the mold against the surface of the molded body, a groove can be formed on the surface of the molded body.

(Step of Forming Fat-Like Portion)

Examples of the step of forming a fat-like portion include a step of forming a fat-like portion by depositing an oil and/or fat in the groove in the formed lean meat-like portion.

The oil and/or fat is deposited in the groove formed on the surface of the lean meat-like portion to fill the groove, whereby a fat-like portion is formed.

When the oil and/or fat is deposited in the groove formed on the surface of the lean meat-like portion, the property of the oil and/or fat may be any of a liquid state, a semi-solid state in which a liquid and a solid are mixed, or a solid state, and is preferably a liquid state or a semi-solid state.

When the oil and/or fat is deposited in the groove formed on the surface of the lean meat-like portion, the oil and/or fat may be deposited in a state of emulsion.

In the case of producing a raw meat-like meat alternative in which the fat-like portion contains an oil and/or fat and a gel, it is preferable that a solution containing a gelation agent, an oil and/or fat, and water is emulsified, that thereafter the emulsion (hereinafter, "an emulsion of the solution containing a gelation agent, an oil and/or fat, and water" is referred to as "emulsifier for gelation") is deposited in the groove formed on the surface of the lean meat-like portion, and that thereafter the emulsion for gelation deposited in the groove is turned into a gel.

The emulsion for gelation is preferably an oil-in-water emulsion.

The oil droplet size of the oil and/or fat in the emulsion for gelation is preferably from 20 μm to 500 μm, more preferably from 30 μm to 400 μm, and still more preferably from 50 μm to 300 μm.

Examples of the method for turning the emulsion for gelation deposited in the groove into a gel include a method of dipping the lean meat-like potion with the emulsion for gelation deposited on the groove thereof in a solution containing a gelation accelerator, and turing the emulsion into a gel.

Further, examples of the step of forming a fat-like portion include a step of printing the fat-like portion on the surface of the raw meat-like meat alternative with white ink using a food printer, a step of cutting a white film into a marble shape and attaching it to the surface of the raw meat-like meat alternative, and the like.

EXAMPLES

Hereinafter, examples will be described. However, the present disclosure is not limited to these examples. In the following description, unless otherwise specified, "parts by mass" and "% by mass" are all based on mass.

Example 1

(Preparation of Ingredient for Lean Meat-Like Portion)

Defatted soybean flour (SHOWA FRESH RF, manufactured by Showa Sangyo Co., Ltd.) as a protein, and wheat gluten (PRO-GLU 65, manufactured by THE TORIGOE Co., Ltd.) as a protein were mixed at 7:3 (=defatted soybean flour:wheat gluten [mass ratio]), whereby a mixed powder 1 was obtained.

A cooling die (die width: 50 mm, lip clearance: 3 mm) having a length of 350 mm was attached to the discharge portion of a twin screw extruder, which was set such that the screw length was 1100 mm and the maximum temperature of the screw tip portion was 155° C., and the outlet temperature of the cooling die was stabilized at 105° C. The mixed powder 1 was introduced into the extruder at 250 g/min, and was discharged from the extruder while water was being added to the extruder in an amount of 50% by mass with respect to the mass of the mixed powder 1, whereby a (fibrous) raw material 1 of a lean meat-like portion having a muscle-like tissue in the extrusion direction was obtained.

(Production of Lean Meat-Like Portion)

The raw material 1 of the lean meat-like portion was boiled with 3 L (liter) of boiling water for 10 minutes, and the water was removed.

The raw material 1 of the lean meat-like portion was cut into a length of 30 mm and torn along the fiber direction to have a width of about 5 mm. The raw material was immersed in an aqueous solution containing SANBEAT CONC (a beet juice concentrated liquid manufactured by San-Ei Gen F.F.I., Inc.) as a colorant (concentration: 3% by mass of the colorant with respect to the entire aqueous solution) to be colored red, and taken out, and the water was removed. Salt, pepper, and HAIMI (a seasoning manufactured by Ajinomoto Co., Inc.) were added thereto as seasoning, and kneading was performed, whereby a strip-shaped fibrous soybean protein 1 was obtained.

Then, to 300 g of the strip-shaped fibrous soybean protein 1, as a binder, 15 g of GENUTINE 310-C(carrageenan, a thermally reversible gel-forming polysaccharide manufactured by Sansho Co., Ltd.) and 15 g of Konbusan 429S (a hardening agent-containing sodium alginate manufactured by KIMICA Corporation, and containing 9.45 g of sodium alginate, which is a thermally irreversible gel-forming polysaccharide, 4.2 g of calcium sulfate as a gelation agent (that is, a salt containing a cation; the same applies hereinafter), and 1.35 g of sodium pyrophosphate as a gelation retarder), and 60 g of water were added thereto and uniformly mixed, whereby a lean meat-like portion precursor A was obtained.

Lean meat-like portion precursors A were arranged such that the extrusion directions (the fiber directions of the raw materials of the lean meat-like portion) were aligned with one another. The lean meat-like portion precursors A were molded to have a shape of a lean portion of a block of meat (a chunk of meat) by using a mold having uneven grooves (depth: 1000 μm) such that a marbled meat pattern, in which the area of the fat-like portion on the surface was 51%, was formed. Then, the molded precursor was allowed to stand and fixed at 75° C. for 5 minutes, whereby a lean meat-like portion A was obtained (the step of forming a lean meat-like portion).

(Production of Fat-Like Portion)

The lean meat-like portion A was cooled to 20° C. or lower, and a palm oil (manufactured by Daabon, product name: Organic palm oil shortening, and melting point: 36° C.; the same applies hereinafter) that had been softened near the melting point as an oil and/or fat was applied on the surface of the lean meat-like portion A. The palm oil was cooled and fixed on the surface of the lean meat-like portion A (the step of forming a fat-like portion), whereby a steak-like marbled raw meat-like meat alternative was obtained. The obtained steak-like marbled raw meat-like meat alternative is shown in FIG. 1.

Example 2

The lean meat-like portion precursors A were arranged such that the extrusion directions (the fiber directions of the raw materials of the lean meat-like portion) were aligned with one another. The lean meat-like portion precursors A were molded to have a shape of lean portion of a block of meat (a chunk of meat) while being wrapped and shaped with a wrapping film, and left to stand at 75° C. for 5 minutes and fixed while a pressure is applied. This was cut in the direction perpendicular to the extrusion direction (fiber direction) of the raw material of the lean meat-like portion into pieces having a thickness of 25 mm, whereby a crude lean meat-like portion was obtained. The surface of the crude lean meat-like portion was engraved with an engraving knife to form a groove so as to form a marbled appearance in which the area (surface area ratio) of the fat-like portion on the surface was 28%, whereby a lean meat-like portion B was obtained.

(Production of Fat-Like Portion)

The obtained lean meat-like portion B was cooled to 20° C. or lower, and a palm oil (manufactured by Daabon, product name: Organic palm oil shortening, and melting point: 36° C.; the same applies hereinafter) that had been softened near the melting point as an oil and/or fat was applied on the surface of the lean meat-like portion B. The palm oil was cooled and fixed on the surface of the lean meat-like portion B, whereby a steak-like marbled raw meat-like meat alternative was obtained.

Example 3

A steak-like marbled raw meat-like meat alternative was obtained in the same manner as in Example 2 except that in Example 2, the surface of the crude lean meat-like portion was engraved with an engraving knife such that the surface area ratio of the fat-like portion was 14%.

Example 4

A steak-like marbled raw meat-like meat alternative was obtained in the same manner as in Example 2 except that in Example 2, the surface of the crude lean meat-like portion was engraved with an engraving knife such that the surface area ratio of the fat-like portion was 3.4%.

Example 5

A steak-like marbled raw meat-like meat alternative was obtained in the same manner as in Example 2 except that in Example 2, the surface of the crude lean meat-like portion was engraved with an engraving knife such that the surface area ratio of the fat-like portion was 52%.

Example 6

A steak-like marbled raw meat-like meat alternative was obtained in the same manner as in Example 1 except that, in the production of the lean meat-like portion, APEX-1000 (a sponge-like soybean protein manufactured by FUJI OIL CO., LTD.) was used as a raw material of the lean meat-like portion, which had been boiled in 3 L (liter) of boiling water for 10 minutes, drained, and torn into a size of about 30 mm×5 mm×5 mm.

Example 7

A steak-like marbled raw meat-like meat alternative was obtained in the same manner as in Example 1 except that, in the production of the lean meat-like portion, "What the cluck" (a fibrous soybean protein manufactured by The Vegetarian Butcher) was used as a raw material of the lean meat-like portion after torn into a size of about 30 mm×5 mm×5 mm.

Example 8

A steak-like marbled raw meat-like meat alternative was obtained in the same manner as in Example 1 except that in Example 1, Lumirror (a PET film manufactured by Toray Industries, Inc.), that had a thickness of 50 μm and that had been cut into a marbled shape of marbled meat, was pressed against the surface of the lean meat-like portion A and fixed thereto to form a shape of a steak, which was allowed to stand at 75° C. for 5 minutes in a fixed state to form marbled grooves having a depth of 50 μm on the surface.

Example 9

A steak-like marbled raw meat-like meat alternative was obtained in the same manner as in Example 8 except that Lumirror (a PET film manufactured by Toray Industries, Inc.) having a thickness of 100 μm was used.

Example 10

Palm oil and rapeseed oil were mixed such that the melting point thereof became 8° C., whereby a mixed oil was obtained. The obtained mixed oil and the lean meat-like portion A obtained in the same manner as in Example 1 were cooled to 4° C. Next, a steak-like marbled raw meat-like meat alternative was obtained in the same manner as in Example 1 except that the mixed oil was applied to the grooves on the surface of the lean meat-like portion A and was fixed thereto.

Example 11

A steak-like marbled raw meat-like meat alternative was obtained in the same manner as in Example 1 except that in Example 1, the "Production of Fat-Like Portion" was replaced with the following procedure.

(Production of Fat-Like Portion)

A steak-like marbled raw meat-like meat alternative was obtained by applying an emulsion 1 produced by the following procedure to the grooves formed on the surface of the lean meat-like portion A.

Preparation Procedure of Emulsion 1

Eight parts by mass of powdered soybean protein (FUJIPRO FR; manufactured by FUJI OIL CO., LTD.) and 2.4 parts by mass of methyl cellulose (METOLOSE MCE100TS; manufactured by Shin-Etsu Chemical Co., Ltd.) were mixed, and then 9 parts by mass of rapeseed oil was added as an oil and/or fat to form a paste. To the obtained paste, 80.6 parts by mass of cold water was added little by little, emulsification was performed with a food mixer, and the mixture was allowed to stand in a refrigerator for 30 minutes, whereby an emulsion 1 having an oil droplet size of 20 μm was obtained.

Example 12

A steak-like marbled raw meat-like meat alternative was obtained in the same manner as in Example 1 except that in Example 1, the "production of a fat-like portion" was replaced with the following procedure.

(Production of Fat-Like Portion)

To 70 parts by mass of an aqueous solution of sodium alginate having a concentration of 1% by mass as an aqueous solution containing a gelation agent, 30 parts by mass of melted coconut oil (PIACOCONA; imported by Alcapia co., Ltd.) as an oil and/or fat was added, and then the oil droplet size was adjusted to 200 µm with a stirrer, whereby an emulsion 2 was obtained. The obtained emulsion 2 was applied into the grooves formed on the surface of the lean meat-like portion A. Thereafter, a steak-like marbled raw meat-like meat alternative was obtained by immersing the lean meat-like portion A, in which the emulsion was applied to the grooves, in a calcium chloride aqueous solution having a concentration of 1% by mass as an aqueous solution containing a gelation accelerator, to form a gel.

Here, the size of the oil droplets of the emulsion was measured by a transmission microscope. The emulsion was recovered to a petri dish, and the oil droplets in the recovered emulsion was observed with a transmission optical microscope to perform photographing at an objective magnification of five times. Two hundred or more images of oil droplets included in a screen obtained by the photographing are selected, and the circle equivalent diameter (the diameter of a perfect circle corresponding to the area of the oil droplet image) of each of the oil droplets is calculated by image processing software (for example, ImageJ). An arithmetic average value of the calculated circle equivalent diameters of the oil droplets was calculated, and the arithmetic average value was defined as the size of the oil droplets.

Example 13

A steak-like marbled raw meat-like meat alternative was obtained in the same manner as in Example 1 except that in Example 1, the "Production of Fat-Like Portion" was replaced with the following procedure.
(Production of Fat-Like Portion)

To 70 parts by mass of an aqueous solution of sodium alginate having a concentration of 1% by mass as an aqueous solution containing a gelation agent, 30 parts by mass of melted coconut oil as an oil and/or fat was added, and then the oil droplet size was adjusted to 20 µm with a stirrer, whereby an emulsion 3 was obtained. The obtained emulsion 3 was applied to the grooves formed on the surface of the lean meat-like portion A. Thereafter, a steak-like marbled raw meat-like meat alternative was obtained by immersing the lean meat-like portion A in which the emulsion was applied to the grooves, in a calcium chloride aqueous solution having a concentration of 1% by mass as an aqueous solution containing a gelation accelerator to form a gel.

Example 14

A steak-like marbled raw meat-like meat alternative was obtained in the same manner as in Example 1 except that, when a colorant and a seasoning were added to the lean meat-like portion in the "Production of Lean Meat-Like Portion" in Example 1, 15 g of melted coconut oil was further added and kneaded.

Example 15

A steak-like marbled raw meat-like meat alternative was obtained in the same manner as in Example 1 except that, when the lean meat-like portion precursor A was molded into a shape of a lean portion of a block of meat in the "Production of Lean Meat-Like Portion" in Example 1, emulsion 2 prepared in Example 12 was hardened by bringing the emulsion 2 into contact with a 1 mass % aqueous solution of calcium hydroxide, and cut into a size of about 5 mm×5 mm×5 mm, and 30 g of the obtained product was mixed in the lean meat-like portion precursor A.

Example 16

Production was carried out in the same manner as in Example 1, except that in the "Production of Lean Meat-Like Portion" in Example 1, the lean meat-like portion precursor B, which was produced by adopting the following procedure after obtaining the strip-shaped fibrous soybean protein 1, was used instead of the lean meat-like portion precursor A, and that the conditions at the time of the fixation using a mold was changed to allowing the lean meat-like portion precursor to stand at 55° C. for an hour while applying a pressure and thereafter performing the fixation by allowing the lean meat-like portion precursor to stand at 80° C. for 10 minutes, instead of allowing the lean meat-like portion precursor to stand at 75° C. for five minutes.
Preparation of Lean Meat-Like Portion Precursor B To 300 g of the strip-shaped fibrous soybean protein 1, 15 g of SUPERCARD (transglutaminase manufactured by Ajinomoto Co., Inc.) as an enzyme that hardens proteins, 15 g of FUJIPRO FR (soybean powder manufactured by Fuji Oil Co., Ltd.) as a binder, 30 g of Konbusan 429S (a hardening agent-containing sodium alginate manufactured by KIMICA Corporation), and 60 g of water were added and uniformly mixed, whereby a lean meat-like portion precursor B was obtained.

Example 17

Production was carried out in the same manner as in Example 1, except that, in the "Production of Lean Meat-Like Portion" in Example 1, the lean meat-like portion precursor C, which was produced by adopting the following procedure after obtaining the strip-shaped fibrous soybean protein 1, was used instead of the lean meat-like portion precursor A, and that the conditions at the time of the fixation using a mold was changed to performing the fixation by allowing the lean meat-like portion precursor to sand at 25° C. for 12 hours.
Preparation of Lean Meat-Like Portion Precursor C To 300 g of the strip-shaped fibrous soybean protein 1, 30 g of Konbusan 429S (a hardening agent-containing sodium alginate manufactured by KIMICA Corporation) as a binder and 60 g of water were added and mixed uniformly to obtain a lean meat-like portion precursor C.

Comparative Example 1

A raw meat-like meat alternative was obtained in the same manner as in Example 1, except that in Example 1, molding was performed using a flat mold that did not have a marble pattern instead of the mold that had uneven grooves, and that the "Production of Fat-Like Portion" was not performed.

Comparative Example 2

A steak-like marbled raw meat-like meat alternative was obtained in the same manner as in Example 2 except that in Example 2, the surface of the crude lean meat-like portion was engraved with an engraving knife such that the surface area ratio of the fat-like portion was about 2%.

Comparative Example 3

A steak-like marbled raw meat-like meat alternative was obtained in the same manner as in Example 2 except that in Example 2, the surface of the crude lean meat-like portion was engraved with an engraving knife such that the major axis was equal to the minor axis in the fat-like portion.

Comparative Example 4

A lean meat-like portion precursor C was prepared in the same manner as in Example 17. Palm oil was solidified at 20° C. or lower, and the solidified palm oil was cut into a size of 3 mm×3 mm×3 mm. To the lean meat-like portion precursor C, 45 g of the cut palm oil was added and mixed, whereby a raw material of the raw meat-like meat alternative was obtained. Raw materials of the raw meat-like meat alternative thus obtained were arranged such that the extrusion directions of the lean meat-like portion precursors C (the fiber directions of the raw materials of the lean meat-like portion) were aligned with one another, and molded into a shape of a block of meat (a chunk of meat) using a flat mold that did not have a marble pattern instead of a mold that had uneven grooves. Then, the molded product was allowed to stand and fixed at 25° C. for 12 hours to obtain a raw meat-like meat alternative.

<Measurement of Major Axis and Minor Axis of Fat-Like Portion>

The major axis and minor axis of the fat-like portion of the raw meat-like meat alternative obtained in each example were measured according to the method described above. In the table, the measured "minor axis of the fat-like portion" and "major axis of the fat-like portion with respect to the minor axis of the fat-like portion" are shown.

Figure 2:
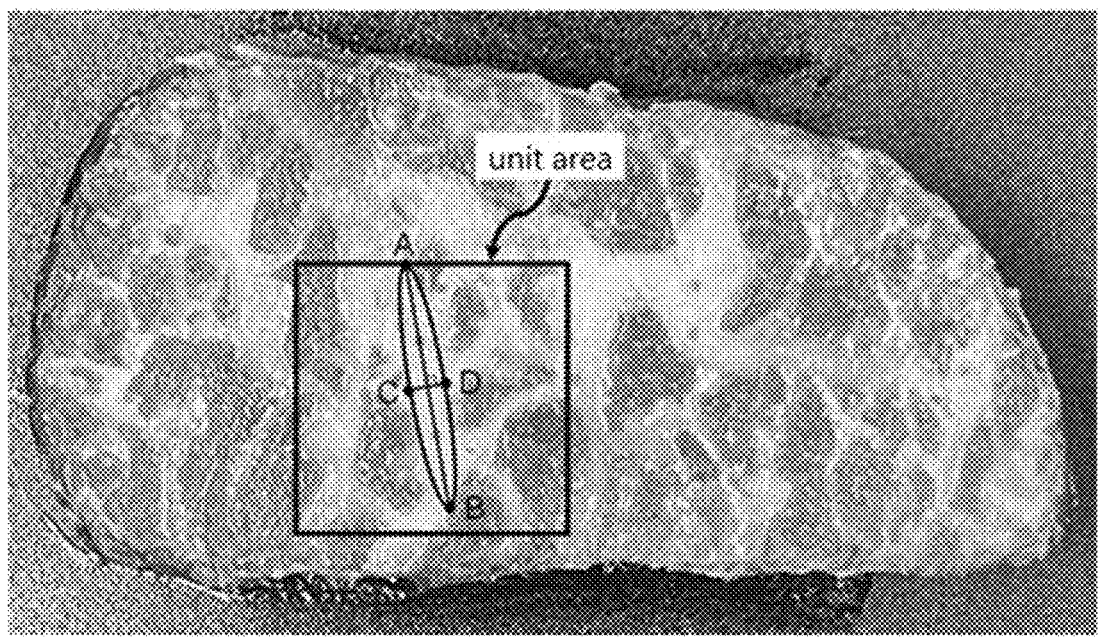
FIG. 2 is a schematic front view showing another example of a raw meat-like meat alternative having a lean meat-like portion and a fat-like portion.
Figure 3:
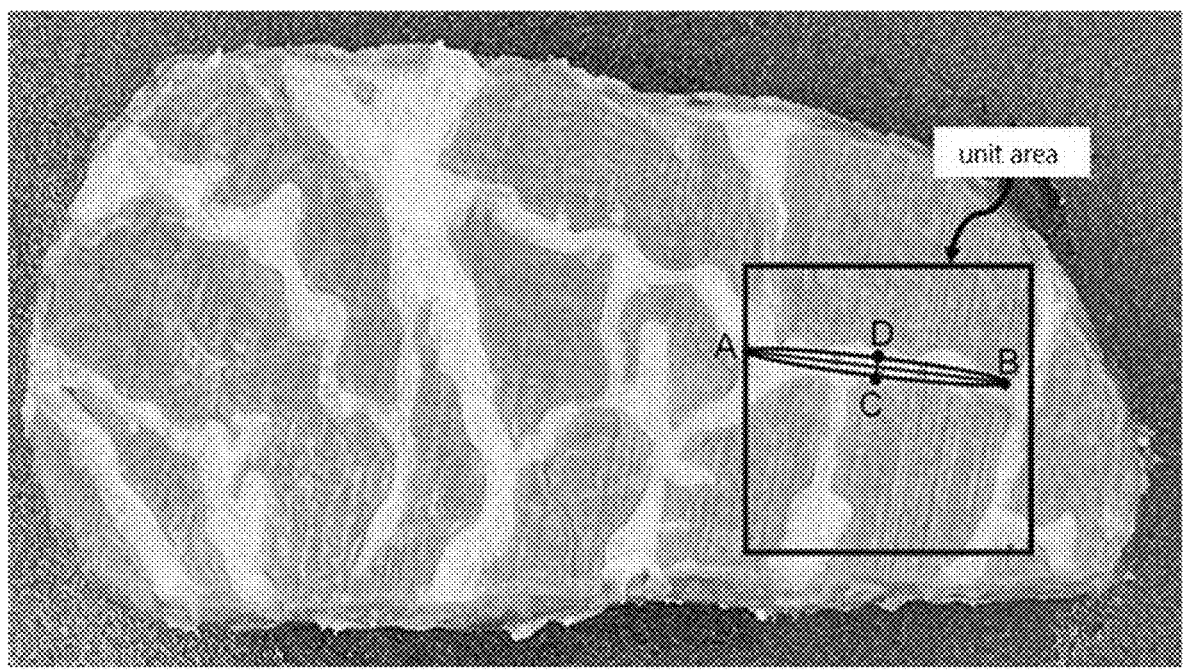
FIG. 3 is a schematic front view showing another example of a raw meat-like meat alternative having a lean meat-like portion and a fat-like portion.
Figure 4:
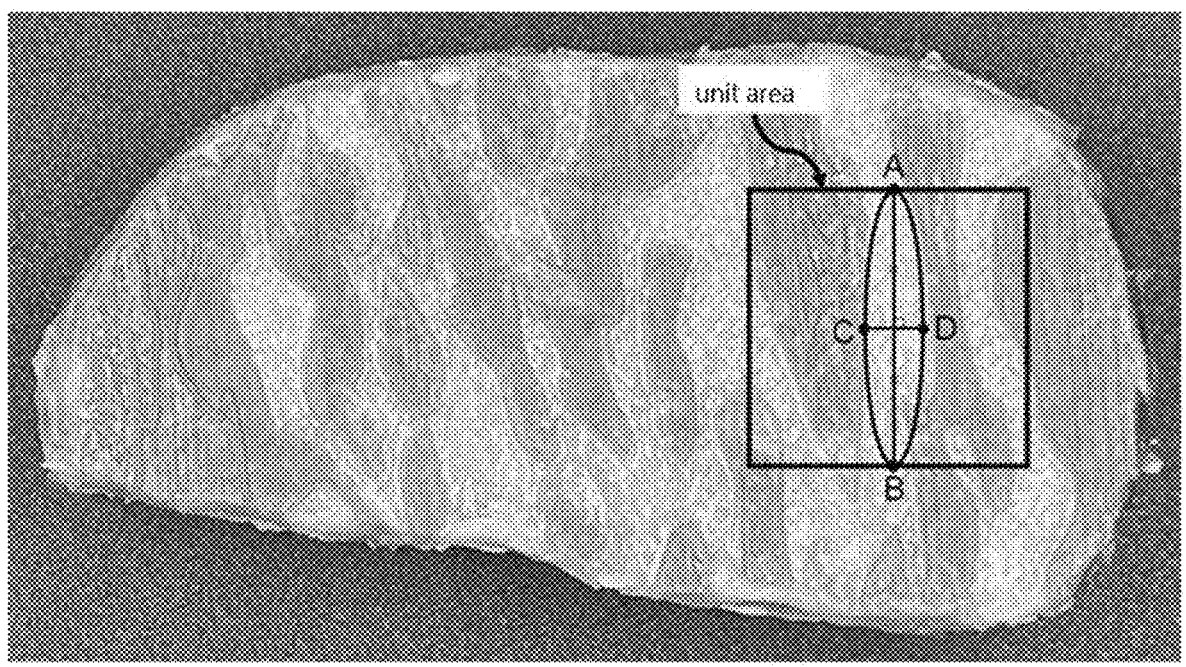
FIG. 4 is a schematic front view showing another example of a raw meat-like meat alternative having a lean meat-like portion and a fat-like portion.
Figure 5:
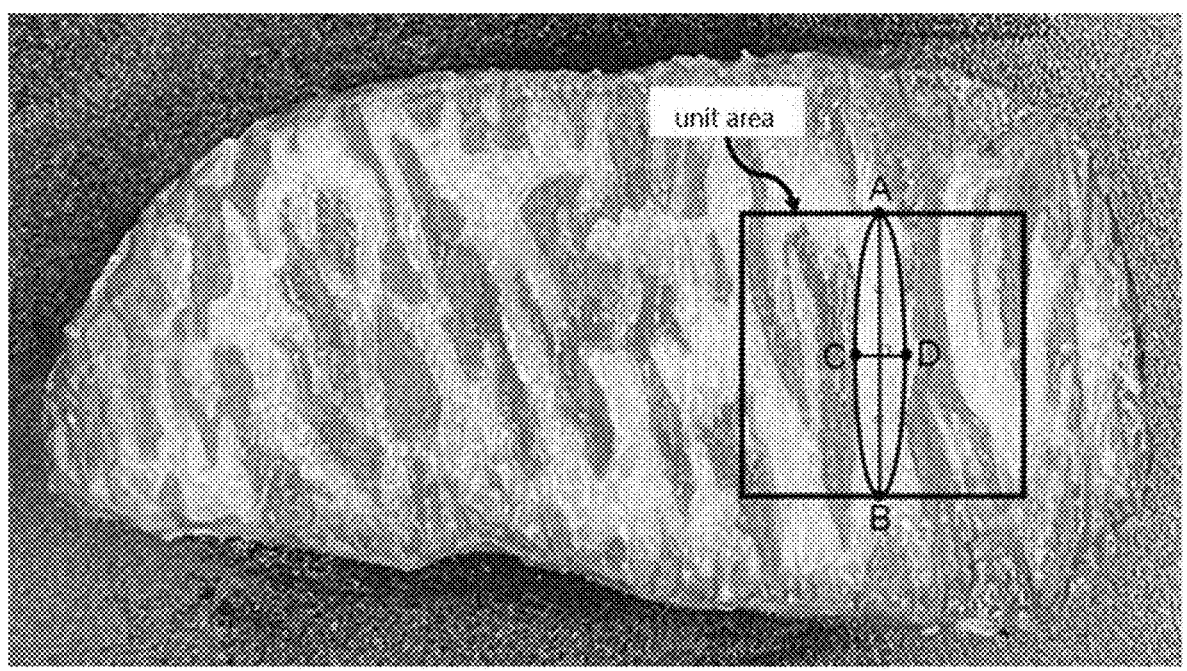
FIG. 5 is a schematic front view showing another example of a raw meat-like meat alternative having a lean meat-like portion and a fat-like portion.

As a specific example, the procedure for measuring the major axis and minor axis of the fat-like portion of the raw meat-like meat alternative obtained in Example 1 (FIG. 1) will be described below with reference to FIG. 2. Note that the raw meat-like meat alternatives shown in FIGS. 1 and 2 are the same.

For the measurement of the major axis and minor axis of the fat-like portion, measurement was performed on the surface of the raw meat-like meat alternative enclosed by a square of 4 cm long and 4 cm wide (that is, "unit area") within the surface of the raw meat-like meat alternative subjected to the measurement.

On the surface of the raw meat-like meat alternative, among the ellipses inscribed by the fat-like portion included in the unit area, the lengths of the major axis (the length between points A and B in FIG. 2) and the minor axis (the length between points C and D in FIG. 2) of the ellipse having the largest area were measured.

The measured major axis (that is, the length between points A and B in FIG. 2) of the ellipse was defined as the major axis of the fat-like portion. Further, the measured minor axis (that is, the length between points C and D in FIG. 2) of the ellipse was defined as the minor axis of the fat-like portion.

<Evaluation>

(Visual Evaluation)

The following evaluations were performed visually by 10 panelists before and after heat-cooking the raw meat-like meat alternative obtained in each example on a hot plate at 200° C.

—Visual Evaluation of the Raw Meat-Like Meat Alternative Before Heat-Cooking ("Appearance Before Cooking" in the Table)—

Whether or not the raw meat-like meat alternative had an appearance similar to that of marbled meat was evaluated and the number of people was counted. As a result of the counting, the number of people who answered that it had an appearance similar to that of marbled meat was counted.

—Visual Evaluation of the Raw Meat-Like Meat Alternative after Heat-Cooking ("Appearance after Cooking" in the Table)—

Whether or not the cooked raw meat-like meat alternative had an appearance similar to that of heated meat was evaluated, and the number of people was counted.

—Visual Evaluation of Integrated Appearance for the Raw Meat-Like Meat Alternative after the Cooking ("Integrated Appearance after Cooking" in the Table)—

Whether or not the cooked raw meat-like meat alternative had an integrated appearance (specifically, a state in which no hole was formed in the raw meat-like meat alternative and a state in which the raw meat-like meat alternative was not split) was evaluated, and the number of people was counted.

(Evaluation of Food Texture)

Ten panelists ate the heat-cooked raw meat-like meat alternative, and evaluated whether or not the meat had a food texture similar to that of heated marbled meat, and the number of people was counted.

(Evaluation Criteria)

Evaluation was performed according to the following evaluation criteria based on the number of people who answered affirmatively. The visual evaluation of the raw meat-like meat alternative before heat-cooking, the visual evaluation of the raw meat-like meat alternative after heat-cooking, and the food texture evaluation were evaluated according to the following (Evaluation Criteria-1), and the other evaluations were evaluated according to the following (Evaluation Criteria-2).

(Evaluation Criteria-1)

S: Nine or more people answered affirmatively.
A: Seven to eight people answered affirmatively.
B: Four to six people answered affirmatively.
C: Three or less people answered affirmatively.

(Evaluation Criteria-2)

A: Seven or more people answered affirmatively.
B: Four to six people answered affirmatively.
C: Three or less people answered affirmatively.

TABLE 1

| | Lean meat-like portion | | Fat-like portion | | | | | | Evaluation | | | |
| | Fibrous/ Sponge-like | Kind of oil and/or fat | Surface area ratio (%) | Minor axis (mm) | Major axis/ Minor axis | Depth (μm) | Melting point of oil and/or fat (° C.) | Composition | Transparency increased or not after heating | Appearance before cooking | Appearance after cooking | Integrated appearance after cooking | Food texture |
|---|---|---|---|---|---|---|---|---|---|---|---|---|---|
| Example 1 | Fibrous | — | 51 | 4.3 | 10.1 | 1000 | 36 | Oil and/or fat | — | S | S | A | B |

TABLE 1-continued

| | Lean meat-like portion | | Fat-like portion | | | | | | | Evaluation | | | |
|---|---|---|---|---|---|---|---|---|---|---|---|---|---|
| | Fibrous/ Sponge-like | Kind of oil and/or fat | Surface area ratio (%) | Minor axis (mm) | Major axis/ Minor axis | Depth (μm) | Melting point of oil and/or fat (° C.) | Com-position | Trans-parency increased or not after heating | Appear-ance before cooking | Appear-ance after cooking | Integrated appearance after cooking | Food texture |
| Example 2 | Fibrous | — | 28 | 3.0 | 8.2 | 1800 | 36 | Oil and/or fat | — | S | S | A | B |
| Example 3 | Fibrous | — | 14 | 2.1 | 12.5 | 1500 | 36 | Oil and/or fat | — | S | S | A | B |
| Example 4 | Fibrous | — | 3.4 | 1.4 | 5.2 | 1900 | 36 | Oil and/or fat | — | A | A | A | B |
| Example 5 | Fibrous | — | 52 | 4.8 | 12.1 | 2100 | 36 | Oil and/or fat | — | S | S | A | B |
| Example 6 | Sponge-like | — | 51 | 4.4 | 10.2 | 1000 | 36 | Oil and/or fat | — | A | A | A | B |
| Example 7 | Fibrous | — | 51 | 4.3 | 10.0 | 1000 | 36 | Oil and/or fat | — | A | A | A | B |
| Example 8 | Fibrous | — | 15 | 1.4 | 5.7 | 50 | 36 | Oil and/or fat | — | B | A | A | B |
| Example 9 | Fibrous | — | 14 | 1.8 | 8.2 | 100 | 36 | Oil and/or fat | — | A | A | A | B |
| Example 10 | Fibrous | — | 51 | 4.3 | 10.1 | 1000 | 8 | Oil and/or fat | — | B | S | A | B |
| Example 11 | Fibrous | — | 51 | 4.2 | 10.1 | 1000 | 24 | Emulsion | — | S | S | A | B |
| Example 12 | Fibrous | — | 51 | 4.3 | 10.7 | 1000 | 24 | Gel | Improved | S | S | A | B |
| Example 13 | Fibrous | — | 51 | 4.4 | 10.6 | 1000 | 24 | Gel | Not improved | S | B | A | B |
| Example 14 | Fibrous | Coconut oil | 51 | 4.3 | 10.2 | 1000 | 36 | Oil and/or fat | — | S | S | A | A |
| Example 15 | Fibrous | Gel (coconut oil) | 51 | 4.4 | 10.3 | 1000 | 36 | Oil and/or fat | — | S | S | A | S |
| Example 16 | Fibrous | — | 51 | 4.2 | 10.5 | 1000 | 36 | Oil and/or fat | — | S | S | A | B |
| Example 17 | Fibrous | — | 51 | 4.2 | 10.5 | 1000 | 36 | Oil and/or fat | — | S | S | A | B |
| Comparative Example 1 | Fibrous | — | 0 | 0 | 0 | 0 | — | — | — | C | A | A | B |
| Comparative Example 2 | Fibrous | — | 2 | 1.4 | 4.2 | 1200 | 36 | Oil and/or fat | — | C | A | A | B |
| Comparative Example 3 | Fibrous | — | 15 | 3.0 | 1 | 1200 | 36 | Oil and/or fat | — | C | A | A | B |
| Comparative Example 4 | Fibrous | Palm oil | 15 | 3.0 | 1 | 3000 | 36 | Oil and/or fat | — | C | C | C | C |

"Transparency increased or not after heating" in Table 1 indicates whether or not the transparency of the fat-like portion before and after heating was increased, the transparency being measured according to the method described above.

"Major axis" and "Minor axis" of the fat-like portion in Table 1 are described according to the following criteria.

"In a case in which a fat-like portion having a minor axis of 1 mm or more and a major axis of 3.0 or more times the minor axis is included"

Among the fat-like portions included in the meat alternative, a fat-like portion having a minor axis of 1 mm or more and a major axis of 3.0 or more times the minor axis was arbitrarily selected, and the major axis and the minor axis of the selected fat-like portion were measured, the results of which were recorded.

"In a case in which a fat-like portion having a minor axis of 1 mm or more and a major axis of 3.0 or more times the minor axis is not included"

Among the fat-like portions included in the meat alternative, an arbitrarily selected fat-like portion was measured for the major axis and the minor axis, and the results were recorded.

From the above results, it can be seen that the raw meat-like meat alternatives of the Examples have an appearance similar to a chunk of meat.

In addition, the raw meat-like meat alternative of Comparative Example 4 did not have an appearance similar to that of a heat-cooked chunk of meat because a large number of large holes were generated in the heat-cooked meat alternative. This is presumably because in the raw meat-like meat alternative of Comparative Example 4, a large amount of palm oil constituting the fat-like portion was also present inside, and the palm oil melted by heat-cooking.

On the other hand, in the raw meat-like meat alternatives of the Examples, the fat-like portion was present near the surface thereof, whereby large holes were less likely to be formed even when the oil and/or fat contained in the fat-like portion melted by heat-cooking, and the appearance similar to a heat-cooked chunk of meat was maintained.

Example 101

(Preparation Step: Production of Fibrous Bundle-Like Organized Protein)

Defatted soybean flour (SHOWA FRESH RF, manufactured by Showa Sangyo Co., Ltd.) as a vegetable protein and wheat gluten (PRO-GLU 65, manufactured by The Torigoe Co., Ltd.) as a vegetable protein were mixed at 7:3 (=defatted soybean flour:wheat gluten [mass ratio]), whereby a mixed powder 1 was obtained.

A cooling die (slit shape: concentric circle type (diameter of inner circle: 29 mm, diameter of outer circle: 35 mm); lip clearance: 3 mm) having a length of 300 mm was attached to the discharge portion of a twin screw extruder, which was set such that the screw length was 1100 mm and the maximum temperature of the screw tip portion was 155° C., and the outlet temperature of the cooling die was stabilized at 105° C. The mixed powder 1 was introduced into the extruder at 530 g/min, and was discharged from the extruder while water was being added to the extruder in an amount of 50% by mass with respect to the mass of the mixed powder 1, whereby a fibrous bundle-like organized protein 1 having a fiber axis direction in the same direction as the extrusion direction was obtained.

(First Step)

The fibrous bundle-like organized protein 1 was boiled with 3 L (liter) of boiling water for 10 minutes, and the water was removed.

The fibrous bundle-like organized protein 1 from which the water had been removed was cut to a length of about 100 mm and was torn along the fiber axis direction to have a width of about 5 mm. The torn product was boiled with an aqueous solution containing SUNGRILL BEEF TASTE 3457E (a seasoning not using an animal material, manufactured by San-Ei Gen F.F.I., Inc.) as a seasoning (concentration: 5% by mass of the seasoning with respect to the entire aqueous solution) for 10 minutes, whereby a strip-shaped fibrous bundle-like organized protein 1 was obtained. The strip-shaped fibrous bundle-like organized protein 1 was immersed in an aqueous solution containing SANBEAT CONC No. 4948 (a colorant manufactured by San-Ei Gen F.F.I., Inc.) as a colorant (concentration: 3% by mass of the colorant with respect to the entire aqueous solution), whereby a strip-shaped fibrous bundle-like organized protein 2 was obtained.

Thereafter, to 150 g of the strip-shaped fibrous bundle-like organized protein 2, 7.5 g of GENUTINE 310-C(a carrageenan manufactured by Sansho Co., Ltd.) containing a thermally reversible gel-forming polysaccharide and 7.5 g of Konbusan 429S (a hardening agent-containing sodium alginate manufactured by KIMICA Corporation) containing a thermally irreversible gel-forming polysaccharide as a binder, 30 g of water, and 30 g of the fat mass composition prepared by the following procedure were added, and the mixture was uniformly mixed, whereby a first step mixture was obtained.

(Preparation of Fat Mass Composition)

(1) Droplet Forming Step

An aqueous phase and an oil phase were prepared as follows.

Aqueous phase: 99.5 parts by mass of tap water and 0.5 parts by mass of RYOTO Sugar Ester M-1695 (manufactured by Mitsubishi Chemical Corporation) as a surfactant were weighed such that the total weight amounted to 5 kg, and stirred with Three-One Motor (manufactured by Shinto Scientific Co., Ltd.) for 30 minutes until completely dissolved.

Oil phase: 1 kg of coconut oil (product name: Organic premium coconut oil (M041); manufactured by COCOW-ELL) was weighed as an oil and/or fat.

Membrane emulsification was performed using a pipe-shaped SPG membrane (manufactured by SPG Technology Co., Ltd.; pore size: 50 μm) with the aqueous phase as a continuous phase and the oil phase as a dispersed phase. Specifically, a pipe-shaped SPG membrane was inserted to and disposed in a tubular container, and from one end to the other end of the container, the aqueous phase was allowed to flow inside the pipe-shaped SPG membrane (inner conduit) at a flow rate of 50 mL/min, and the oil phase was allowed to flow outside the pipe-shaped SPG membrane (outer conduit (passage between the container and the SPG membrane)) at a flow rate of 10 mL/min.

As a result, an aqueous solution containing droplets containing an oil and/or fat (hereinafter, also referred to as droplet dispersion) was obtained.

The droplets containing an oil and/or fat had a particle size of 190 μm and a CV value of 19%.

Here, the particle size and CV value of the oil and/or fat-containing droplets were measured by a transmission optical microscope.

The droplet dispersion recovered to a petri dish was observed using a transmission optical microscope and photographed at an objective magnification of five times. Two hundred or more images of droplets containing an oil and/or fat included in the screen obtained by the photographing were selected, and the circle equivalent diameter (the diameter of a perfect circle corresponding to the area of the droplet image) of each droplet was calculated by image processing software (for example, ImageJ). The arithmetic average value of the calculated circle equivalent diameters of the droplets was calculated, and the arithmetic average value was defined as "the average particle size of the droplets containing an oil and/or fat".

The CV value of the oil and/or fat-containing droplets is a value obtained by the following formula.

CV value of droplets containing an oil and/or fat (%)=((standard deviation of circle equivalent diameters of droplets containing an oil and/or fat)/(average particle size of droplets containing oil and/or fat))×100

The standard deviation of the circle equivalent diameters of the oil and/or fat-containing droplets is the standard deviation of the circle equivalent diameters of 200 oil and/or fat-containing droplets, which was calculated in the measurement of the average particle size of the oil and/or fat-containing droplets.

(2) Oil and/or Fat Solidifying Step

The droplet dispersion was added to a separatory funnel and then allowed to stand for 30 minutes. Since the droplet dispersion separated into a phase containing oil and/or fat-containing droplets and an aqueous phase, the aqueous phase was discharged from the separatory funnel, and the phase containing oil and/or fat-containing droplets was recovered.

The phase containing oil and/or fat-containing droplets recovered was allowed to stand in a refrigerator having an internal temperature of 5° C. for 1 hour to be cooled, whereby the oil and/or fat was solidified, and an aqueous solution containing particles (hereinafter, also referred to as particle-containing liquid) was obtained.

(3) Crosslinking Step

An aqueous solution containing an edible ionic crosslinkable polymer (hereinafter, also referred to as ionic crosslinkable polymer solution) was obtained by mixing 1 part by mass of sodium alginate (KEVIICA ALGINE I-1; manufactured by KIMICA Corporation) as an edible ionic crosslinkable polymer, 0.5 parts by mass of RYOTO Sugar Ester M-1695 (manufactured by Mitsubishi Chemical Corporation) as a surfactant, and 98.5 parts by mass of tap water.

To 100 parts by mass of the ionic crosslinkable polymer solution, 100 parts by mass of the particle-containing liquid was added, and the mixture was slowly stirred with a stirrer (Three-One Motor, manufactured by Yamato Scientific Co., Ltd.) to obtain a solution 1. The obtained solution 1 was poured into a stainless bat such that the thickness of the solution was 3 mm.

One part by mass of calcium chloride (food additive grade, manufactured by FUJIFILM Wako Pure Chemical Corporation) as a salt containing a cation was dissolved in 99 parts by mass of tap water to prepare an aqueous solution 1 containing a cation. The aqueous solution 1 containing a cation in the same mass as that of the solution 1 contained in the stainless bat was poured into the stainless bat, and allowed to stand in a refrigerator having an internal temperature of 5° C. for 2 hours to crosslink (form a gel of) the edible ionic crosslinkable polymer, thereby obtaining a crude fat mass composition.

The crude fat mass composition was washed with tap water, then the moisture on the surface was wiped off with KIMTOWEL, and the composition was cut into bars of about 1 mm×1 mm×30 mm. The oil and/or fat attached to the surface of the cut crude fat mass composition was washed with edible ethanol to obtain a fat mass composition.

(Second Step)

After the first step mixture was formed into a spherical shape having a diameter of about 60 mm, the first step mixture was stretched by rotating and pressing the first step mixture on the surface of a set of three rollers having an uneven shape arranged as shown in FIG. 19 to obtain a post-stretching mixture having a stretch ratio of 3 times.

Thereafter, the post-stretching mixture was cut at the central position in the longitudinal direction of the post-stretching mixture, and the cut post-stretching mixtures were stacked with the longitudinal directions of the cut post-stretching mixtures being aligned with one another, and were adjusted to form a cylindrical shape. Thereafter, the stacked post-stretching mixtures were pressed while being rotated using the roller set arranged as shown in FIG. 19, and further cut and stretched again to obtain a post-stretching mixture having a total stretch ratio of 12 times.

—Details of Roller—
  Length of roller in axial direction: 500 mm
  Diameter of roller: 50 mm
  Number of rotation of roller: 10 rpm
  Radius of a circle that would be in contact with all three rollers at the start of the second step: 30 mm
  Radius of a circle that would be in contact with all three rollers at the end of the second step: 20 mm (Third Step)

Figure 21:
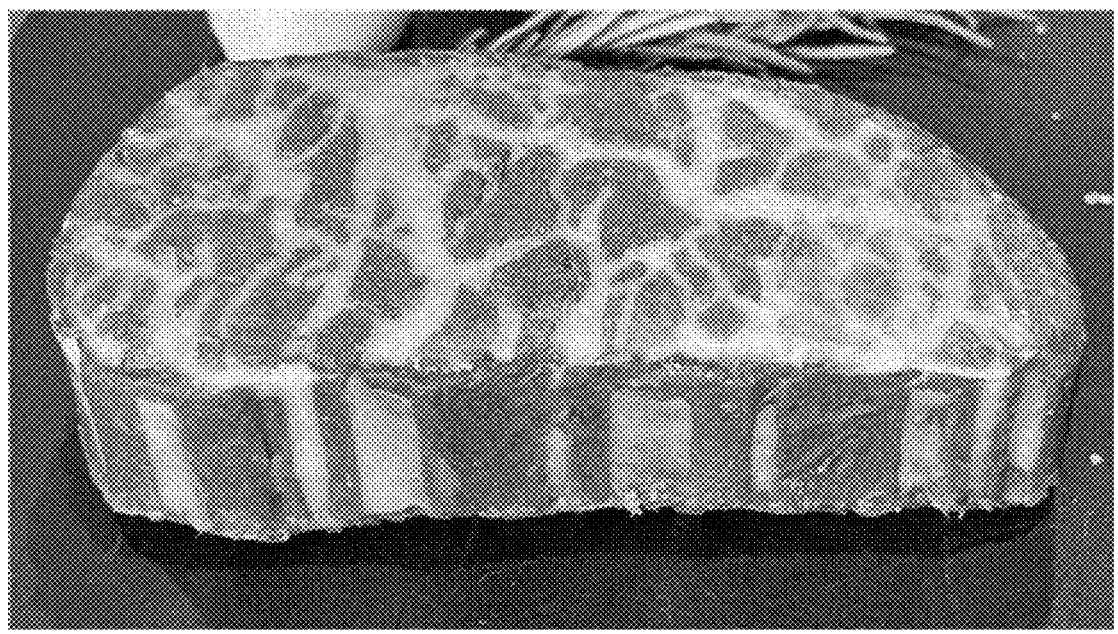
FIG. 21 is a schematic perspective view showing an example of a raw meat-like meat alternative according to the present disclosure.

The post-stretching mixture was cut in the direction orthogonal to the fiber axis direction of the fibrous bundle-like organized protein contained in the post-stretching mixture, in the same length as the thickness of a steak. Plural cut post-stretching mixtures were arranged such that the fiber direction was the film thickness direction, and molded into a shape of a block of meat by using a mold having uneven grooves (depth: 1000 μm) so as to form a marbled meat pattern in which the area of the fat-like portion on the surface was 51%. Then, fixation was performed by allowing the post-stretching mixtures to stand at 75° C. for 5 minutes. The post-stretching mixtures were cooled to 20° C. or lower, and a palm oil (manufactured by Daabon, product name: Organic palm oil shortening; melting point: 36° C.; the same applies hereinafter) that had been softened near the melting point as an oil and/or fat was applied to the surface. The palm oil was cooled and fixed on the surface, whereby a steak-like marbled raw meat-like meat alternative was obtained. The obtained steak-like marbled raw meat-like meat alternative is shown in FIG. 21.

<Evaluation>

(Visual Evaluation)

The following evaluations were performed visually by 10 panelists before and after heat-cooking the raw meat-like meat alternative obtained in each example on a hot plate at 200° C.

—Visual Evaluation Before Heat-Cooking ("Appearance Before Heat-Cooking" in Table 2)—

Whether or not the mixture had an appearance similar to that of steak meat before heat-cooking was evaluated, and the number of people who answered affirmatively was counted.

—Visual Evaluation after Heat-Cooking ("Appearance after Heat-Cooking" in Table 2)—

Whether or not the mixture had an appearance similar to that of steak meat after heat-cooking was evaluated, and the number of people who answered affirmatively was counted.

—Visual Evaluation of Cross Section after Heat-Cooking ("Cross Section after Heat-Cooking" in Table 2)—

The raw meat-like meat alternative after heat-cooking was cut in the thickness direction, and whether or not the cut surface had an appearance similar to that of the cut surface of steak meat after heat-cooking was evaluated. The number of people who answered affirmatively was counted.

(Analysis of Orientation Degree of Fibers and Standard Deviation of Orientation Angle)

The specific integrated orientation degree and the specific standard deviation of orientation angle of the post-stretching mixture were measured by the method described in (Method of Measuring Specific Integrated Orientation Degree and Specific Standard Deviation of Orientation Angle) described above.

The integrated orientation degree and the standard deviation of orientation angle in the fiber direction in a cross section of the raw meat-like meat alternative were measured by the method described in (Method of Measuring Integrated Orientation Degree and Standard Deviation of Orientation Angle of Raw Meat-Like Meat Alternative) described above.

(Evaluation of Food Texture)

Ten panelists ate the heat-cooked raw meat-like meat alternative, and evaluated whether or not the meat had a food texture similar to that of heat-cooked steak meat, and the number of people who answered affirmatively was counted.

(Evaluation Criteria)

The evaluation criteria for each evaluation were as follows.

—Evaluation Criteria—
S: Nine or more people answered affirmatively.
A: Seven to eight people answered affirmatively.
B: Four to six people answered affirmatively.
C: Three or less people answered affirmatively.

containing sodium alginate manufactured by KIMICA Corporation) containing a thermally irreversible gel-forming polysaccharide.

"Method" indicates a method of stretching the first step mixture in the second step.

"(i)" means (i) a method of allowing the mixture to pass through an area surrounded by a set or rollers in the direction perpendicular to a plane containing the rotation axes of the set of rollers so as to press the mixture by the rollers, thereby stretching the mixture in the direction perpendicular to the plane containing the rotation axes of the set of rollers.

Fig.: when a specific aspect of the method of stretching the first step mixture in the second step is shown in a figure, the number of the figure is indicated.

TABLE 2

| | Preparation method | | | | | Ingredients | | | |
|---|---|---|---|---|---|---|---|---|---|
| | FIG. | Method | Number of times | Stretch ratio | Integrated orientation degree of post-stretching mixture | Standard deviation of orientation angle of post-stretching mixture | Fibrous bundle-like organized protein | Coloring | Binder | Oil and/or fat |
| Example 101 | FIG. 19 | (i) | 3 | 12 | 1.41 | 6.4 | 1 | present | 310C/ 429S | Fat mass composition inside and outside |

| | Fibrous texture | | | Fat-like portion | | | Before heat-cooking | After heat-cooking | | |
|---|---|---|---|---|---|---|---|---|---|---|
| | Integrated orientation degree | Standard deviation of orientation angle | Orientation direction | Surface area ratio (%) | Minor axis (mm) | Major axis/ Minor axis | Appearance | Appearance | Cross section | Food texture |
| Example 101 | 1.43 | 6.7 | Film thickness | 51 | 4.2 | 10.5 | S | S | S | S |

Abbreviations and the like in Table 2 will be described below.

Orientation direction: when the fiber axis direction of the organized protein contained in the raw meat-like meat alternative is oriented in one direction, it is described as "film thickness" or "width". When the fiber axis direction of the fibrous bundle-like organized protein contained in the raw meat-like meat alternative is not oriented in one direction, it is described as "—".

The term "film thickness direction" means that the fiber axis direction of the fibrous bundle-like organized protein is oriented in the thickness direction of the raw meat-like meat alternative.

The term "width direction" means that the fiber axis direction of the fibrous bundle-like organized protein is oriented in the direction orthogonal to the thickness direction of the raw meat-like meat alternative.

Fibrous bundle-like organized protein: "1" means the fibrous bundle-like organized protein 1.

Binder: "310-C" means GENUTINE 310-C(a carrageenan manufactured by Sansho Co., Ltd.) containing a thermally reversible gel-forming polysaccharide. "429S" means Konbusan 429S (a hardening agent- "Number of times" indicates the number of times of stretching.

"Orientation degree of post-stretching mixture" means a specific integrated orientation degree.

"Standard deviation of orientation angle of post-stretching mixture" means a specific standard deviation of orientation angle.

"Coloring" means whether or not a colorant was used in the (First Step). The term "present" means that a colorant was used.

"Major axis" and "minor axis" of the fat-like portion in Table 2 are described according to the following criteria. Among the fat-like portions included in the meat alternative, a fat-like portion having a minor axis of 1 mm or more and a major axis of 3.0 or more times the minor axis was arbitrarily selected, and the major axis and the minor axis of the selected fat-like portion were measured, and the results were described.

From the above results, it can be seen that in the method for producing a raw meat-like meat alternative of the Examples, a raw meat-like meat alternative having an appearance before and after heat-cooking and a cross-section and food texture after the heat-cooking close to livestock meat can be obtained.

The disclosures of Japanese Patent Application No. 2021-178080 filed on Nov. 30, 2021 and Japanese Patent Application No. 2022-171797 filed on Oct. 26, 2022 are incorporated herein by reference in their entirety.

All documents, patent applications, and technical standards described in this specification are incorporated herein by reference to the same extent as if each document, patent application, and technical standard were specifically and individually indicated to be incorporated by reference.

DESCRIPTION OF REFERENCE NUMERALS

1 First step mixture
2, 22, 23, 32, 42 Pair of rod-like rollers
43 Spiral uneven shape
52 Roller
53 Guide
4 Post-stretching mixture
C Protruding portion
D Portion having no protrusion

The invention claimed is:

1. A raw meat-like meat alternative, comprising a lean meat-like portion and a fat-like portion, wherein:
   an area of the fat-like portion on a surface of the raw meat-like meat alternative is 3% or more with respect to an entire area of the surface;
   the fat-like portion on the surface includes a portion having a minor axis of 1 mm or more and having a major axis of 3.0 or more times the minor axis; and
   the fat-like portion has a depth of 100 μm or more from the surface.

2. The raw meat-like meat alternative according to claim 1, wherein the lean meat-like portion contains a vegetable protein and is sponge-like or fibrous.

3. The raw meat-like meat alternative according to claim 1, wherein the fat-like portion contains at least one of an oil or a fat having a melting point of 10° C. or higher.

4. The raw meat-like meat alternative according to claim 1, wherein the fat-like portion contains an emulsion.

5. The raw meat-like meat alternative according to claim 1, wherein the fat-like portion contains at least one of an oil or a fat encapsulated in a gel.

6. The raw meat-like meat alternative according to claim 5, wherein transparency of the fat-like portion is increased by heating.

7. The raw meat-like meat alternative according to claim 1, wherein the lean meat-like portion contains at least one of an oil or a fat.

8. The raw meat-like meat alternative according to claim 7, wherein the at least one of an oil or a fat contained in the lean meat-like portion is a vegetable oil.

9. The raw meat-like meat alternative according to claim 1, wherein the raw meat-like meat alternative contains at least one of an oil or a fat encapsulated in a gel.

10. A method for producing a raw meat-like meat alternative, the method comprising:
    forming a lean meat-like portion having a red color and forming a groove having a depth of 100 μm or more from a surface of the lean meat-like portion, or forming a lean meat-like portion having a red color while forming a groove having a depth of 100 μm or more from a surface of the lean meat-like portion; and
    thereafter depositing at least one of an oil or a fat in the groove to form a fat-like portion.

11. The method for producing a raw meat-like meat alternative according to claim 10, wherein at least the groove is formed with a mold.

* * * * *